(12) United States Patent
Wu

(10) Patent No.: US 10,783,342 B2
(45) Date of Patent: Sep. 22, 2020

(54) GRAPHIC CODE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Wenliang Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 29 days.

(21) Appl. No.: 16/206,739

(22) Filed: Nov. 30, 2018

(65) Prior Publication Data

US 2019/0197276 A1 Jun. 27, 2019

Related U.S. Application Data

(63) Continuation of application No. PCT/CN2017/103272, filed on Sep. 25, 2017.

(30) Foreign Application Priority Data

Sep. 30, 2016 (CN) .......................... 2016 1 0878832

(51) Int. Cl.
*G06K 7/14* (2006.01)
*G06T 5/30* (2006.01)
*G06F 17/18* (2006.01)

(52) U.S. Cl.
CPC .......... *G06K 7/1443* (2013.01); *G06F 17/18* (2013.01); *G06K 7/14* (2013.01); *G06K 7/1417* (2013.01); *G06K 7/1456* (2013.01); *G06T 5/30* (2013.01)

(58) Field of Classification Search
CPC ...... G06K 7/1443; G06K 7/14; G06K 7/1417; G06K 7/1456

(Continued)

(56) References Cited

U.S. PATENT DOCUMENTS 6,332,574 B1 * 12/2001 Shigekusa .......... G06K 7/10722
235/462.09
7,398,927 B2 * 7/2008 Olmstead ........... G06K 7/10752
235/454

(Continued)

FOREIGN PATENT DOCUMENTS

CN 101147157 A 3/2008
CN 104112153 A 10/2014

(Continued)

OTHER PUBLICATIONS

The World Intellectual Property Organization (WIPO) International Search Report for PCT/CN2017/103272 dated Dec. 4, 2017 5 Pages (including translation).

*Primary Examiner* — Paultep Savusdiphol
(74) *Attorney, Agent, or Firm* — Anova Law Group, PLLC

(57) ABSTRACT

A graphic code processing method is provided. The method includes capturing an environment containing a graphic code, determining continuous distribution regions of pixels of a captured image in different reference directions, and identifying an overlapping region of the continuous distribution regions as a potential distribution region of the graphic code. The method also includes identifying a scanning step length from a partial image corresponding to the potential distribution region, and scanning the partial image based on the scanning step length to obtain a graphic code image. Further, the method includes performing decoding processing based on the graphic code image, until decoding succeeds and information modulated in the graphic code is obtained from the graphic code image.

20 Claims, 25 Drawing Sheets

(58) Field of Classification Search
USPC ............... 235/462.09, 462.12, 462.1, 462.11
See application file for complete search history.

(56) References Cited

U.S. PATENT DOCUMENTS

2006/0163355 A1* 7/2006 Olmstead ........... G06K 7/10752
235/454
2018/0365461 A1* 12/2018 Wang ................... G06K 7/1417

FOREIGN PATENT DOCUMENTS

| CN | 104700062 A | 6/2015 |
| CN | 104850815 A | 8/2015 |

* cited by examiner

GRAPHIC CODE PROCESSING METHOD AND APPARATUS, AND STORAGE MEDIUM

CROSS REFERENCE OF RELATED APPLICATIONS

This application is a continuation application of PCT Patent Application No. PCT/CN2017/103272, filed on Sep. 25, 2017, which claims priority to China Patent Application No. 201610878832.2, filed with the Chinese Patent Office on Sep. 30, 2016, which is incorporated herein by reference in its entirety.

FIELD OF TECHNOLOGY

The present disclosure relates to technologies of scanning and decoding graphic codes and, in particular, to a graphic code processing method and apparatus, and a storage medium.

BACKGROUND

Graphic codes such as QR codes are widely applied in social, payment, and other scenarios. A user adjusts the posture of a code scanning device (for example, a mobile terminal having a camera, such as a smart phone or a tablet computer, or a special scanning terminal for scanning, such as a scanner gun), so that when the contour of the image of a graphic code presented in a preview interface for image capture is consistent with a predetermined scan region in the preview interface (for example, the contour of the scan region is prompted in the preview interface, so that the user can adjust the posture of the terminal), the code scanning device captures the graphic code and performs decoding to obtain information in the graphic code, such as receiving account information of a recipient or a landing page address in an advertisement. As such, sending of electronic money or page redirection can be implemented correspondingly.

In practical applications, when a user scans a graphic code, the image of the graphic code in the preview interface for image capture is often inconsistent with a scan-frame set in the preview interface. As a result, the captured graphic code is too small with respect to the scan frame, or an image of the graphic code formed in the scan frame is incomplete, and therefore the captured graphic code cannot be decoded.

SUMMARY

Embodiments of the present disclosure provide a graphic code processing method and apparatus, and a storage medium, to resolve the problem that a graphic code is unidentifiable because an image of the graphic code has an excessively small size or is incomplete.

According to one, an embodiment of the present disclosure provides a graphic code processing method. The method includes capturing an environment containing a graphic code, determining continuous distribution regions of pixels of a captured image in different reference directions, and identifying an overlapping region of the continuous distribution regions as a potential distribution region of the graphic code. The method also includes identifying a scanning step length from a partial image corresponding to the potential distribution region, and scanning the partial image based on the scanning step length to obtain a graphic code image. Further, the method includes performing decoding processing based on the graphic code image, until decoding succeeds and information modulated in the graphic code is obtained from the graphic code image.

According to another aspect, an embodiment of the present disclosure provides a graphic code processing apparatus. The apparatus includes a capture unit configured to capture an environment comprising a graphic code; a memory storing computer program instructions; and a processor coupled to the memory. When executing the computer program instructions, the processor is configured to perform: determining continuous distribution regions of pixels of a captured image in different reference directions, and identifying an overlapping region of the continuous distribution regions as a potential distribution region of the graphic code; identifying a scanning step length from a partial image corresponding to the potential distribution region, and scanning the partial image based on the scanning step length to obtain a graphic code image; and performing decoding processing based on the graphic code image, until decoding succeeds and information modulated in the graphic code is obtained from the graphic code image.

Other aspects of the present disclosure can be understood by those skilled in the art in light of the description, the claims, and the drawings of the present disclosure.

BRIEF DESCRIPTION OF THE DRAWINGS

FIG. 2-1 is a schematic flowchart of a graphic code processing method according to an embodiment of the present disclosure;

FIG. 2-2 is a schematic diagram of an optional scenario of a graphic code processing method according to an embodiment of the present disclosure;

FIG. 3 is a schematic diagram of an optional software and hardware structure of a graphic code processing apparatus according to an embodiment of the present disclosure;

FIG. 4-1 is a schematic flowchart of a graphic code processing method according to an embodiment of the present disclosure;

FIG. 4-2 is a schematic flowchart of a graphic code processing method according to an embodiment of the present disclosure;

FIG. 5-1 to FIG. 5-3 are a schematic diagram of forming different graphic codes in a preview interface according to an embodiment of the present disclosure;

FIG. 7-1 to FIG. 7-38 are schematic diagrams of processing results in a processing procedure from capturing an image including a QR code to identifying a QR code image according to an embodiment of the present disclosure; and FIG. 8-1 and FIG. 8-2 are schematic diagrams of a graphic code processing apparatus according to an embodiment of the present disclosure.

DETAILED DESCRIPTION

The embodiments of the present disclosure are described in further detail below with reference to the accompanying drawings and embodiments. It should be understood that, the specific embodiments described herein are only used for illustrating the present disclosure rather than limiting the present disclosure.

Before the embodiments of the present disclosure are described in further detail, certain technical terms involved in the embodiments of the present disclosure are illustrated. The technical terms involved in the embodiments of the present disclosure apply to the following explanations.

1) A graphic code is a graph formed by specific graphic elements that are distributed on a plane (two-dimensional directions) according to a particular rule. For example, several symbols (graphical elements) corresponding to a binary code are used in the graphic code to represent information such as characters or numerals. Generally, a code system of the graphic code has a specific character set. Each character in the character set occupies a particular width, and has a particular check function, and the like. Common graphic codes include QR codes, bar codes, and the like.

2) A graphic code image is an image including at least part of a graphic code. For example, all regions of the graphic code image display an image of a QR code, or a partial region of the graphic code image displays an image of a QR code and other regions of the graphic code image display images of other objects in an environment, such as people and things.

3) Image binarization means setting gray values of pixels on an image to 0 or 255, that is, enabling the entire image to present a clear black and white effect.

4) Decoding is a process of recovering symbols in a QR code image to a binary code and obtaining specific information (such as a page address and contact information) based on the binary code.

5) An instance, namely, an instance requesting to scan a QR code, is an application, a process, or the like that requests to scan a code during running of a code scanning device. For example, the instance is a social application.

Figure 1:
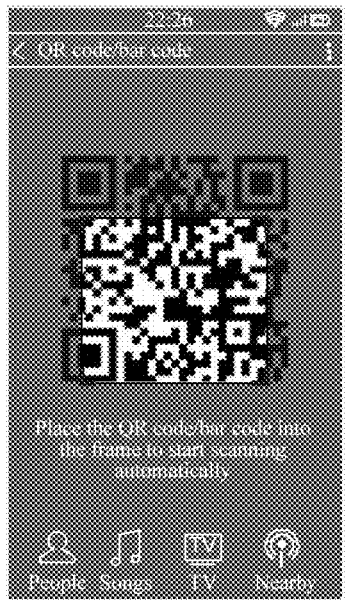
FIG. 1-1 to FIG. 1-3 are schematic diagrams of code scanning based on a scan frame according to a related technology.
Figures 1, 2:
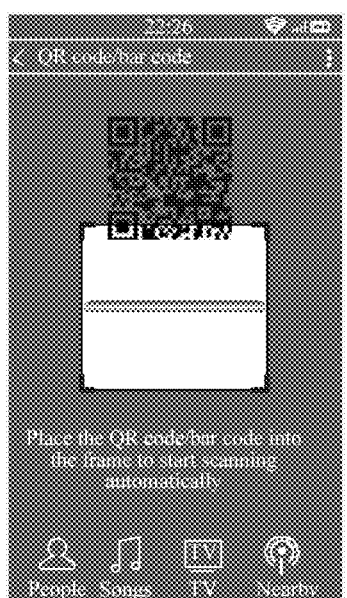
Figures 1, 2, 3:
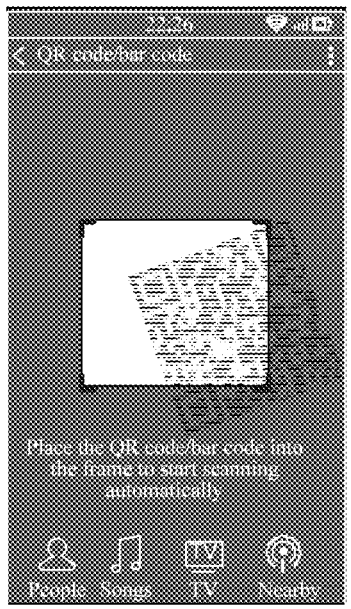
Figures 1, 2:
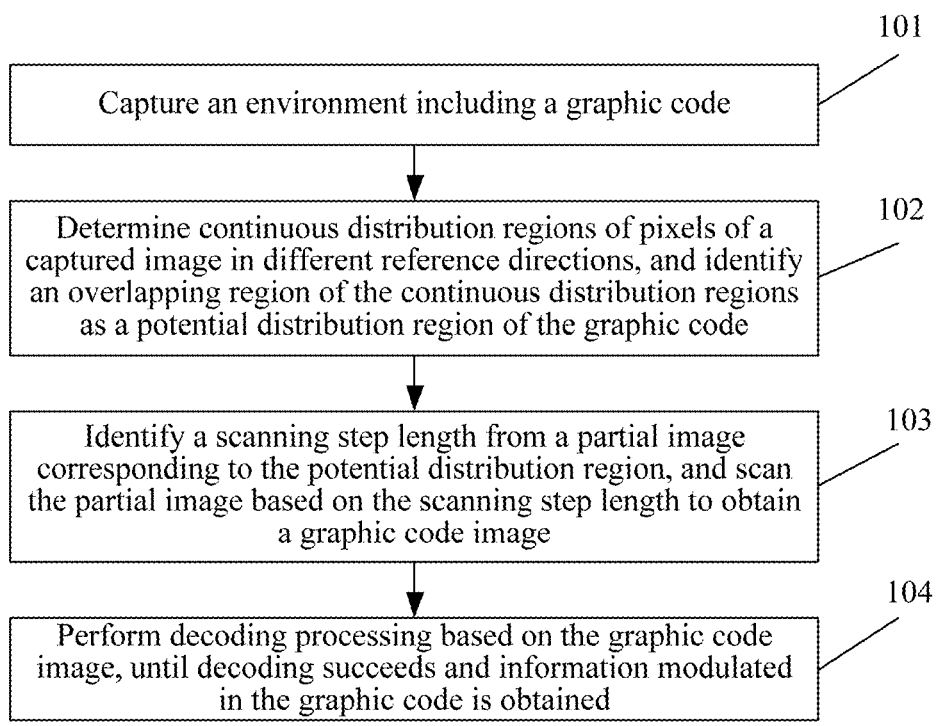
Figure 2:
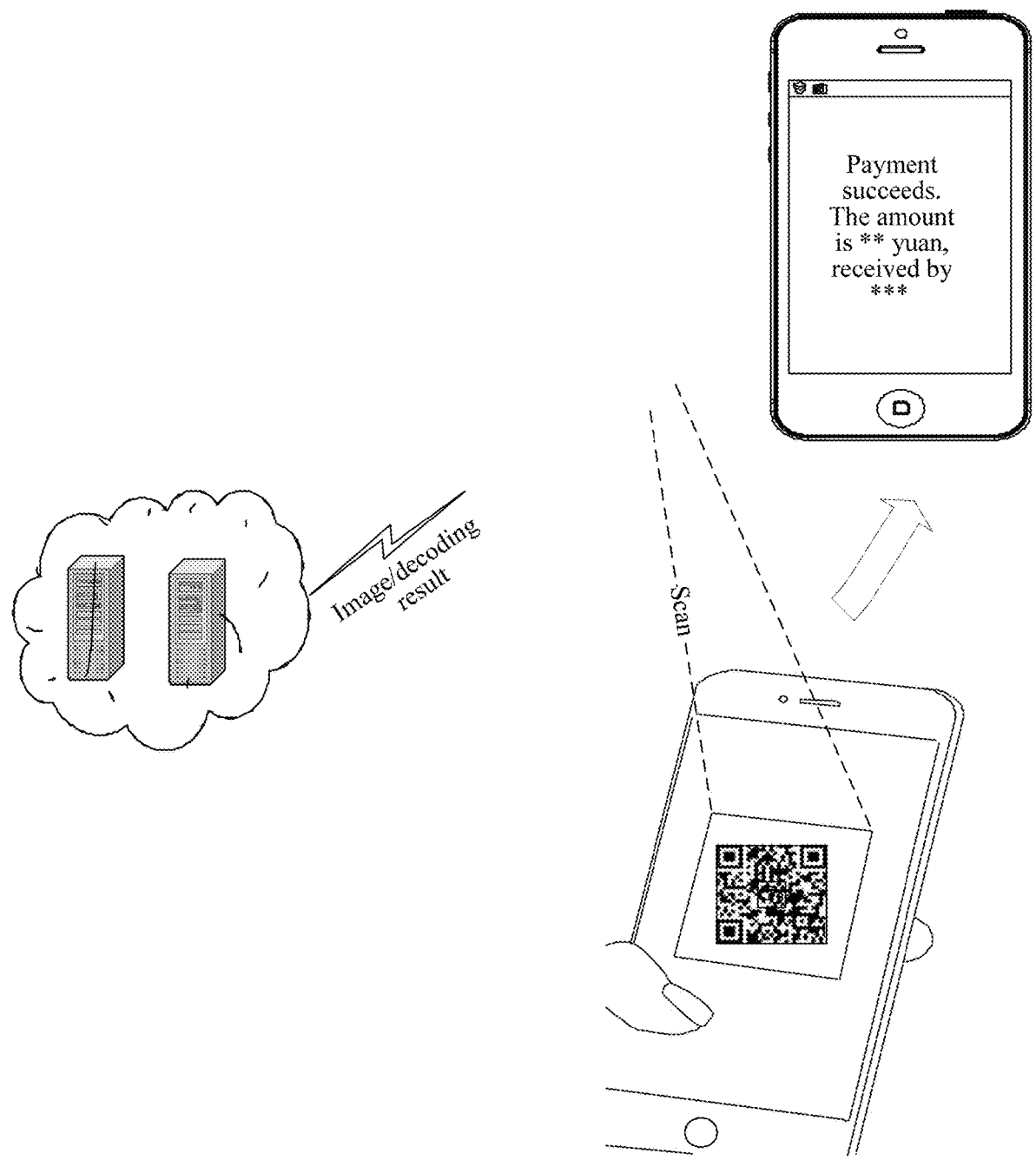
Figure 3:
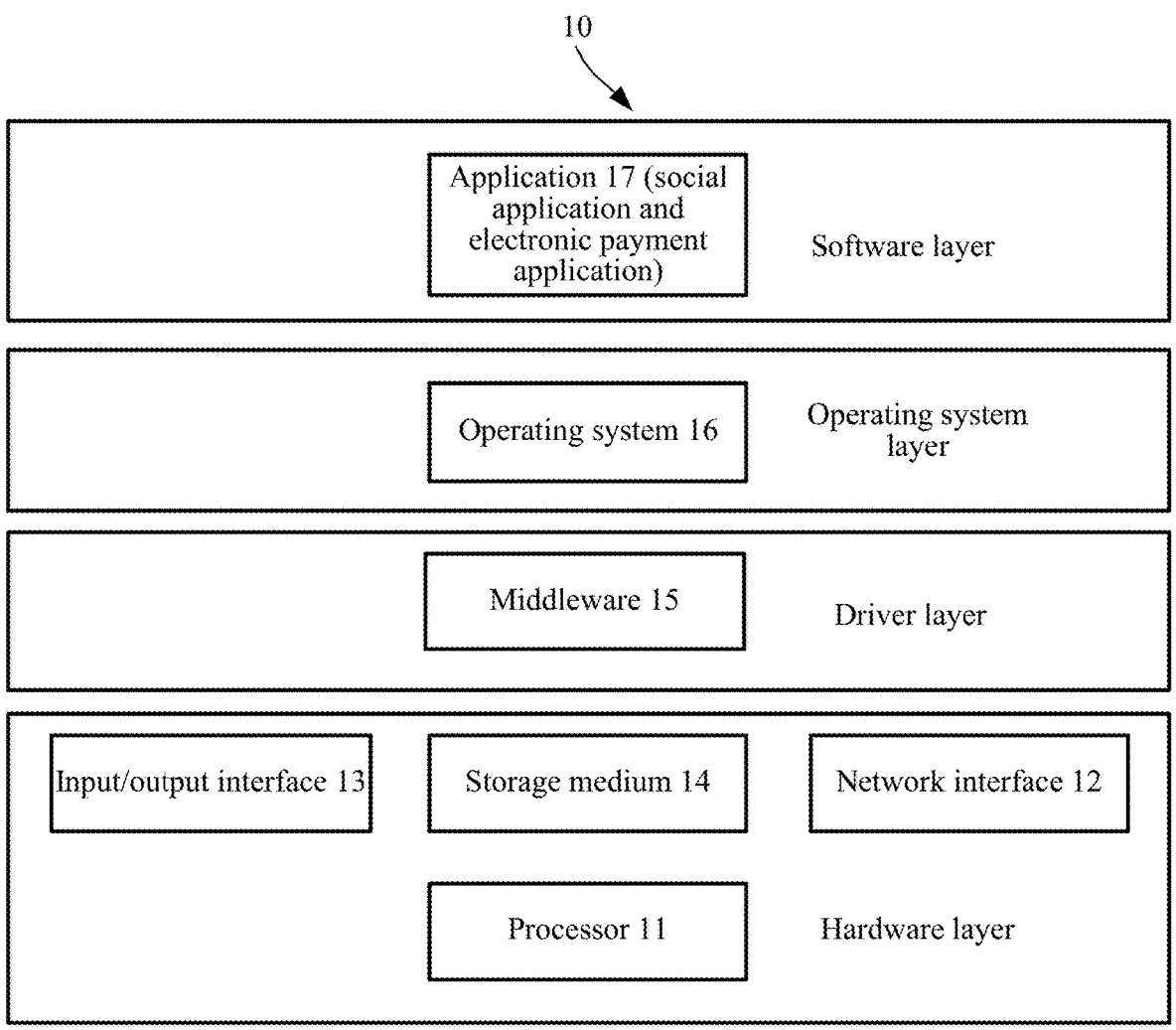

A QR code scanning and decoding process in a related technology is described herein by using an example in which the graphic code is a QR code. Referring to FIG. 1-1, when a graphic code is relatively close to a user and has a relatively large size, an image formed by the graphic code in a preview interface will exceed a predetermined scan region when the user cannot move conveniently. As a result, only part of the QR code can be scanned when a scan operation is performed in the scan region. Referring to FIG. 1-2, when a QR code is at a relatively high position, only part of the QR code can be captured in a scan frame. Referring to FIG. 1-3, a user cannot adjust an orientation direction of a terminal that is used to capture a QR code (for example, because space of an environment where the user is located is limited). As a result, only part of the QR code can be scanned when a scan operation is performed in a scan region.

The problem of failing to decode a captured graphic code will occur in all the situations above. In view of the problem, an embodiment of the present disclosure provides a graphic code processing method. Referring to a schematic flowchart of a graphic code processing method shown in FIG. 2-1, the method includes the following.

Step 101, capturing an environment including a graphic code.

Step 102, determining continuous distribution regions of pixels of a captured image in different reference directions, and identifying an overlapping region of the continuous distribution regions as a potential distribution region of the graphic code.

Step 103, identifying a scanning step length from a partial image corresponding to the potential distribution region, and scanning the partial image based on the scanning step length to obtain a graphic code image.

Step 104, performing decoding processing based on the graphic code image, until decoding succeeds and information modulated in the graphic code is obtained.

An embodiment of the present disclosure can provide graphic code processing apparatus using the foregoing graphic code processing method. The graphic code processing apparatus can be implemented in various manners as follows.

For example, as shown in FIG. 2-2, the graphic code processing apparatus specifically may be various mobile terminals having an image capture function, such as a smart phone and a tablet computer. Herein, the mobile terminal can capture a graphic code by using a built-in camera (such as a front camera or a rear camera), so that the mobile terminal identifies the graphic code from the captured image.

For another example, modules in the graphic code processing apparatus are disposed on a mobile terminal side and a server side that is at a cloud end. The mobile terminal captures an image including a graphic code and sends the image to the server at the cloud end. The server at the cloud end identifies the graphic code from the image, decodes the graphic code, and sends a decoding result to the mobile terminal for processing.

For another example, a graphic code processing module can be disposed in a system on chip (SoC) having an image capture function, a graphic code identification function and a graphic code decoding function, and can be implemented by using technologies such as an application specific integrated circuit (ASIC) and a field programmable gate array (FPGA). For example, it is supported to identify and decode a graphic code in a captured image, and it is supported to interact with a mobile terminal or a server by means of communication. A location result is outputted and/or an identification result is outputted when an output condition is met (for example, when time arrives).

For another example, the graphic code processing apparatus may be disposed on a special scanning device used for identifying graphic codes, for example, a bar code scanner gun, or a QR code scanner gun.

An embodiment of the present disclosure further provides a computer readable storage medium, for example, a memory including a computer program. Further, the storage medium stores a computer program. When executed by a processor in the graphic code processing apparatus, the computer program implements the disclosed graphic code processing method. Herein, the computer readable storage medium may be a ferromagnetic random-access memory (FRAM), a read-only memory (ROM), a programmable read-only memory (PROM), an erasable programmable read-only memory (EPROM), an electrically erasable programmable read-only memory (EEPROM), a flash memory, a magnetic surface memory, an optical disc, a compact disc read-only memory (CD-ROM), or the like, and may also be various devices including one of a any combination of the foregoing memories.

Further, the computer readable storage medium stores a computer program. When executed by the processor, the computer program implements the following steps: capturing an environment including a graphic code; determining continuous distribution regions of pixels of a captured image in different reference directions, and identifying an overlapping region of the continuous distribution regions as a potential distribution region of the graphic code; identifying a scanning step length from a partial image corresponding to the potential distribution region, and scanning the partial image based on the scanning step length to obtain a graphic code image; and performing decoding processing based on the graphic code image, until decoding succeeds and information modulated in the graphic code is obtained.

In an embodiment, when executed by the processor, the computer program further implements the following steps: presenting the captured image in a preview interface, the captured image being used for adjusting a capture orientation until the graphic code is completely imaged in the preview interface.

In an embodiment, when executed by the processor, the computer program further implements the following steps: before locating the potential distribution region of the graphic code in the captured image, performing decoding processing based on a partial image that is formed in a scan frame of a preview interface by the captured image, and detecting that decoding fails.

In an embodiment, when executed by the processor, the computer program further implements the following steps: before locating the potential distribution region of the graphic code in the captured image, performing decoding based on a partial image that is formed in a scan frame of a preview interface by the captured image, and when the information modulated in the graphic code is obtained through decoding, stopping capturing the environment including the graphic code.

In an embodiment, the performing decoding processing based on the graphic code image includes: performing adjustment until a size of the identified graphic code image is the same as a size of the scan frame, and performing decoding processing based on the adjusted graphic code image.

In an embodiment, when executed by the processor, the computer program further implements the following steps: presenting the information modulated in the graphic code, and/or sending the information modulated in the graphic code to an instance requesting to scan the graphic code.

In an embodiment, the determining continuous distribution regions of pixels of a captured image in different reference directions, and identifying an overlapping region of the continuous distribution regions as a potential distribution region of the graphic code includes: determining continuous distribution regions, which are in different reference directions, of black pixels in a binary image of the captured image, and identifying an overlapping region of the continuous distribution regions as a potential distribution region of the graphic code in the corresponding image.

In an embodiment, the determining continuous distribution regions, which are in different reference directions, of black pixels in a binary image of the captured image includes: determining statistical histograms, which correspond to different reference directions, of the black pixels in the binary image of the captured image, denoising the statistical histograms, and mapping continuous distribution regions in the denoised statistical histograms to regions in the binary image of the corresponding image.

In an embodiment, the denoising the statistical histograms includes: equally dividing the statistical histograms along the corresponding reference directions to obtain equal division blocks, and setting statistical data in an equal division block meeting a predetermined condition to zero.

In an embodiment, the setting statistical data in an equal division block meeting a predetermined condition to zero includes at least one of the following: when a difference degree of the statistical data in the equal division block exceeds a threshold, setting the statistical data in the corresponding equal division block to zero; when statistical data in adjacent equal division blocks of the equal division block is zero, setting the statistical data in the corresponding equal division block to zero; and when a signal-to-noise ratio between the equal division block and an adjacent equal division block is a minimum signal-to-noise ratio between adjacent equal division blocks, setting the statistical data in the corresponding equal division block to zero.

In an embodiment, the identifying a scanning step length from a partial image corresponding to the potential distribution region includes: performing dilation and erosion operations on a binary image of the partial image, identifying black pixel blocks in the binary image of the partial image and accumulated numbers of occurrences of black pixel blocks having adjacent sizes, and identifying a scanning step length based on sizes of black pixel blocks corresponding to a highest accumulated number of occurrences.

In an embodiment, the identifying black pixel blocks in the binary image of the partial image and accumulated numbers of occurrences of black pixel blocks having adjacent sizes, and determining sizes of black pixel blocks corresponding to a highest accumulated number of occurrences includes: sampling the binary image of the partial image according to different reference directions to obtain bar images, identifying lengths of continuous distribution regions in respective statistical histograms of the bar images, counting the number of occurrences of each length and adjacent lengths in a length fluctuation range, and selecting lengths corresponding to a highest number of occurrences as the sizes of the black pixel blocks corresponding to the highest number of occurrences.

In an embodiment, the scanning the partial image based on the scanning step length to obtain a graphic code image includes: scanning a binary image of the partial image based on the scanning step length, mapping a set of pixels that are obtained through scanning and meet a scan mode to the binary image of the partial image, and identifying a set of pixels obtained through mapping as the graphic code image.

In an embodiment, the scanning the partial image based on the scanning step length to obtain a graphic code image includes: when black pixels meeting a predetermined scan mode are detected in the binary image of the partial image and it is detected that white pixels meeting the predetermined scan mode exist at positions having a distance of the scanning step length from the black pixels, forming the set based on the detected black pixel.

In an embodiment, when executed by the processor, the computer program further implements the following steps: before the mapping a set of pixels that are obtained through scanning and meet a scan mode to the binary image of the partial image, performing denoising processing on the set of the pixels based on histograms of the set of the pixels.

In actual application, on a hardware level, for example, the disclosed graphic code processing apparatus can be implemented based on resources of a mobile terminal (or a server), for example, computing resources (such as computing resources implemented by using a processor) and communication resources (such as communication resources implemented by using a network interface). In this case, the mobile terminal is an entity for executing the graphic code processing method shown in FIG. 2-1.

Further, it is also possible that some steps of the graphic code processing method provided in the embodiments of the present disclosure are performed by a mobile terminal at a user side, and other steps of the method are performed at a server side. For example, a mobile terminal and an instant messaging server perform the foregoing graphic code processing method cooperatively. Correspondingly, the graphic code processing apparatus is also implemented based on resources at the instant messaging server side and the mobile terminal side together, for example, computing resources (such as a processor) and communication resources (such as a network interface).

Similarly, on a software level, the disclosed graphic code processing apparatus can be implemented as executable instructions stored in a storage medium, including computer executable instructions such as a program and a module. The storage medium may be disposed in an instant messaging server, or distributed in an instant messaging server and a mobile terminal.

As described above, referring to a schematic diagram of an optional software and hardware structure of a graphic code processing apparatus 10 shown in FIG. 3, the graphic code processing apparatus 10 includes a software layer, a driver layer, an operating system and a hardware layer. However, a person skilled in the art should understand that, the structure of the graphic code processing apparatus 10 shown in FIG. 3 is merely an example, which does not limit the structure of the graphic code processing apparatus 10. For example, the graphic code processing apparatus 10 may be deployed with more components than those shown in FIG. 3 according to an implementation requirement, or some components may be omitted according to an implementation requirement.

In actual applications, as shown in FIG. 3, the hardware layer of the graphic code processing apparatus 10 includes a processor 11, an input/output interface 13, a storage medium 14, and a network interface 12, where the components are connected and communicate with each other through a bus.

Further, the processor 11 may be implemented by using a central processing unit (CPU), a microcontroller unit (MCU), an ASIC, or an FPGA.

The input/output interface 13 may be implemented by using an input/output device such as a display screen, a touch screen, or a loudspeaker.

The storage medium 14 may be implemented by using a non-volatile storage medium such as a flash memory, a hard disk, or an optical disc, or may be implemented by using a volatile storage medium such as a double data rate (DDR) dynamic cache. The storage medium 14 stores executable instructions for executing the foregoing information processing method.

For example, the storage medium 14 may be disposed at the same place as the graphic code processing apparatus 10, or may be disposed at a remote place with respect to the graphic code processing apparatus 10, or distributed locally and remotely with respect to the graphic code processing apparatus 10. The network interface 12 provides the processor 11 with a capability of accessing external data, such as a capability of accessing the remotely disposed storage medium 14. For example, the network interface 12 may perform short-distance communication based on a Near Field Communication (NFC) technology, a Bluetooth technology, and a ZigBee technology, and can also implement communication based on communication standards such as Code Division Multiple Access (CDMA) and Wideband Code Division Multiple Access (WCDMA) as well as evolved standards thereof.

The driver layer includes a middleware 15 that is used by an operating system 16 to identify the hardware layer and communicate with components of the hardware layer, for example, may be a set of driver programs for the components of the hardware layer.

The operating system 16 is configured to provide a user-oriented graphical interface, for example, including a plug-in icon, a desktop background, and an application icon. The operating system 16 supports a user to control a device by using the graphical interface. Herein, this embodiment of the present disclosure does not limit a software environment of the device, such as a type and a version of the operating system. For example, the operating system may be an Android operating system, an iOS operating system, a Linux operating system, or a UNIX operating system.

The software layer includes various applications 17 that need to scan a graphic code, for example, including a social application that adds a friend, transfers money, or sends an electronic red envelope by scanning a graphic code, and/or an electronic payment application that pays to a merchant by scanning a graphic code.

The following specific embodiments of the present disclosure are proposed based on the graphic code processing method shown in FIG. 2-1 and the graphic code processing apparatus shown in FIG. 3.

In the following, the description is made by using an example in which the graphic code processing method provided in the embodiment of the present disclosure is implemented on a mobile terminal at a user side. Correspondingly, the graphic code processing apparatus shown in FIG. 3 may be implemented as a mobile terminal at a user side. Other implantations of the graphic code processing apparatus may be carried out according to the following description. Based on the implementation of the graphic code processing method provided in the embodiment of the present disclosure at the mobile terminal side, a person skilled in the art can easily migrate a part of processing to a server at a cloud end for implementation, so that the server at the cloud end and the mobile terminal at the user side implement the graphic code processing method provided in the embodiment of the present disclosure cooperatively. For example, the mobile terminal completes capture of an image including a graphic code; the server at the cloud end locates and identifies the graphic code in the image, and sends the identified QR code to an application (such as a social application or an electronic payment application) that is in the mobile terminal and that needs to perform processing based on a graphic code identification result.

Figures 1, 4:
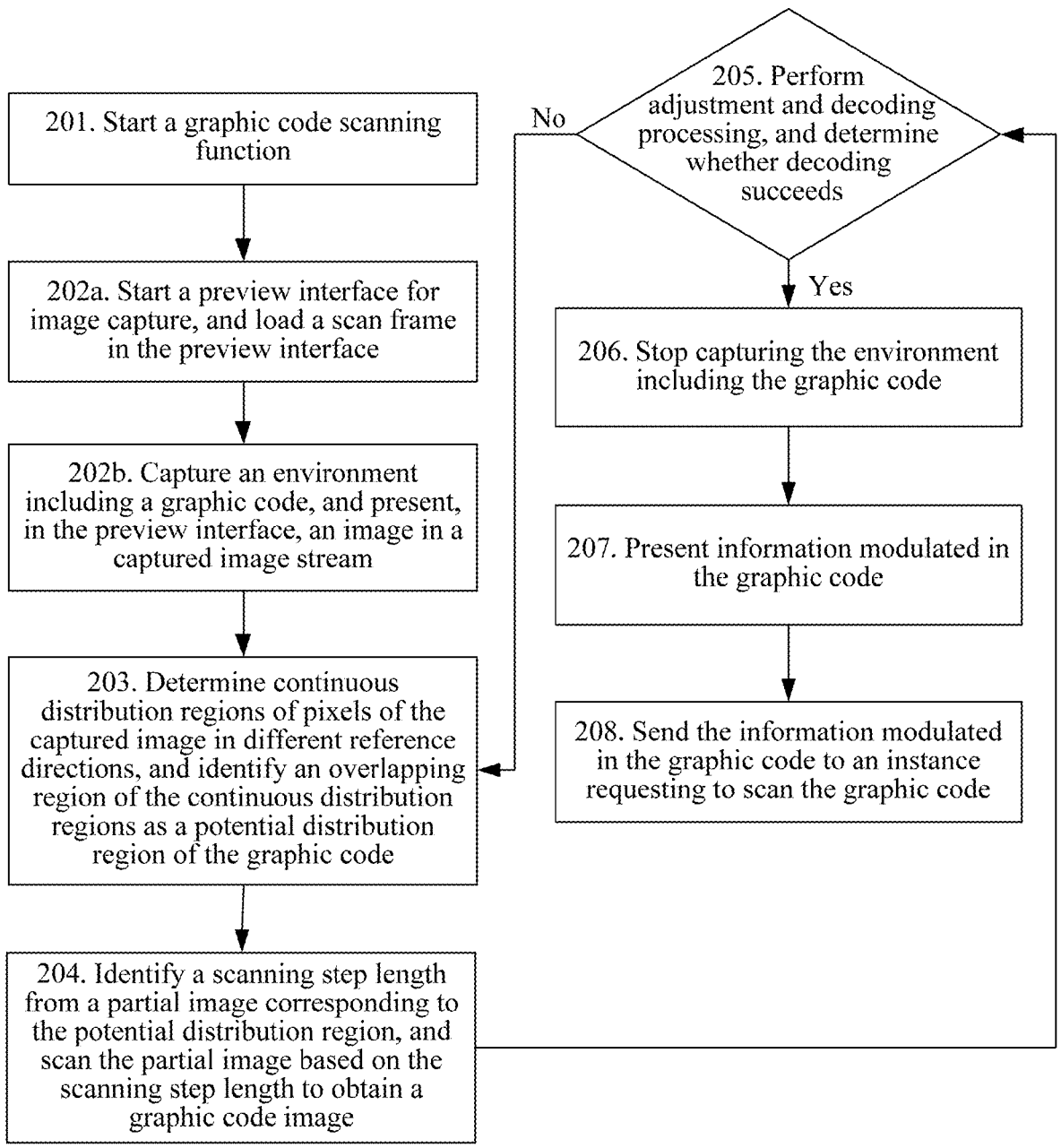
Figures 2, 4:
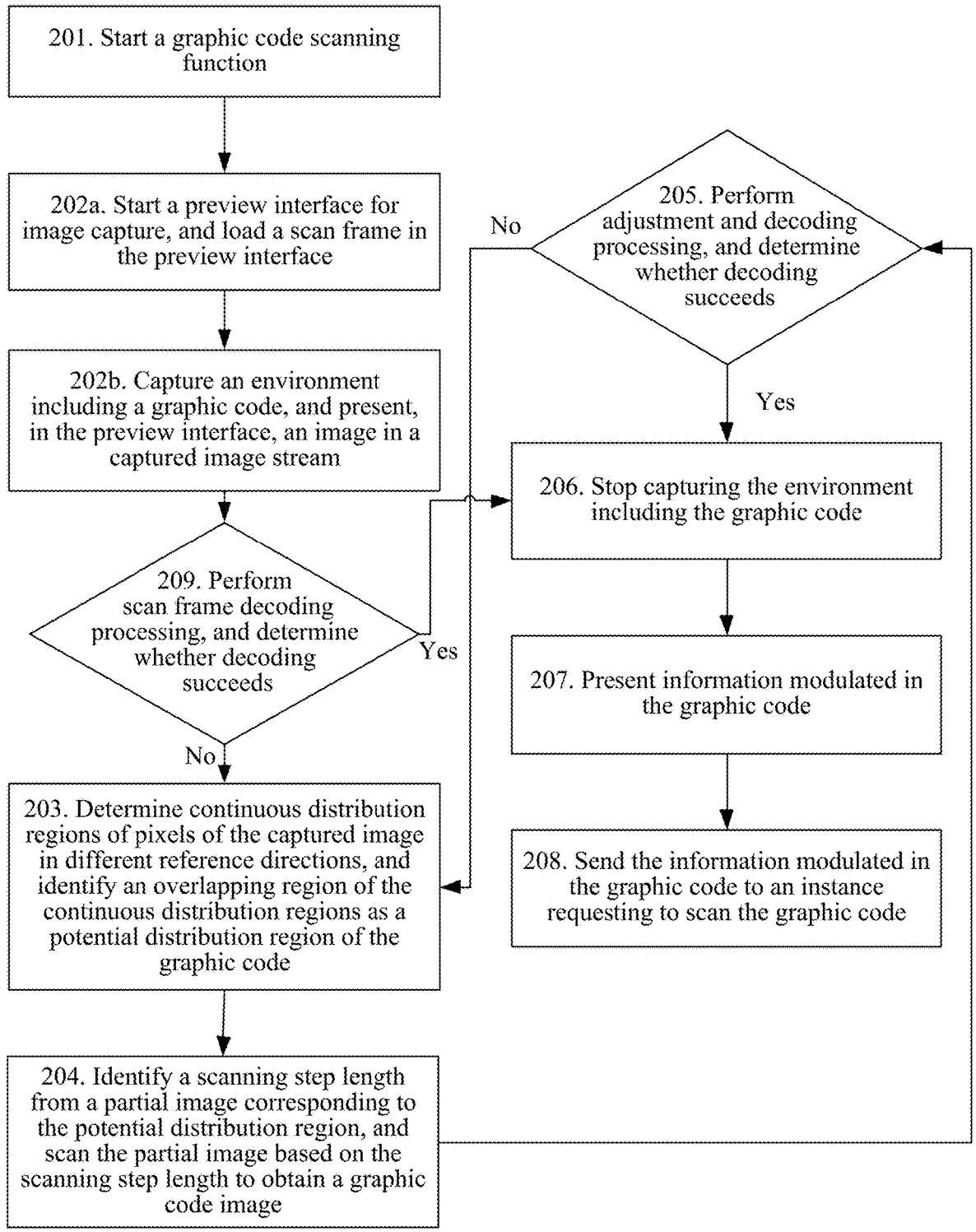

In the following, by using an example in which the graphic code processing apparatus is implemented as a scanning device (for example, a mobile terminal such as a smart phone or a special scanning device such as a scanner gun) that implements the graphic code processing method, a description is made with reference to a schematic flowchart of a graphic code processing method according to an embodiment of the present disclosure shown in FIG. 4-1. Referring to FIG. 4-1, graphic code processing includes the followings.

Step 201: Starting a graphic code scanning function.

For example, when using a social application in a mobile phone, a user starts a code scanning function such as "Scan" in a social application by using a touch operation or a trigger operation in another form, to scan a QR code name card, a QR code recipient account, or a QR code website. For another example, a cashier of a shopping mall uses a code-scanning cashiering function of a scanner gun to scan a bar code of a commodity purchased by a user, or scan a payment QR code shown by the user to deduct money.

The subsequent steps illustrate a responding process of the scanning device after the graphic code scanning function is enabled.

When the graphic code scanning function of the scanning device is started, even if a preview interface and a scan frame are not started in the scanning device, the scanning device can still capture an image including a complete QR code as long as the user adjusts the scanning device to an appropriate capture orientation.

In an embodiment, when the graphic code scanning function of the scanning device is started, the scanning device can further start a preview interface and a scan frame located inside the preview interface, so that the user can view the captured image conveniently and hence adjust the capture orientation of the scanning device, to achieve efficiently capturing an image including a complete QR code. A description is made below with reference to step 202a and step 202b.

Step 202a: Starting a preview interface for image capture, and load a scan frame in the preview interface.

Step 202b: Capturing an environment including a graphic code, and presenting, in the preview interface, an image in a captured image stream.

If the preview interface is started while the scanning function is started, the user can observe whether imaging of the QR code is completed in the preview interface, to determine whether to adjust the capture orientation of the scanning device, thereby laying the foundation for targeted adjustment of the capture orientation of the scanning device and also laying the foundation for rapid and complete imaging of the QR code in the preview interface.

Herein, the scan frame located in the preview interface is used for assisting the user in adjusting the capture orientation of the scanning device, so that the graphic code in the environment has an imaging size in the preview interface the same as the scan frame or is located in the scan frame, therefore laying the foundation for rapid scanning and decoding of the graphic code.

It can be understood that, the scan frame may be at multiple positions and have multiple shapes. For example, the scan frame is located at a central part of the preview interface (definitely, the scan frame may also be located at another part, such as an upper part of the preview interface), and an outer profile of the scan frame is presented, where the profile is square, round, or of another shape (a solid-line or dashed-line block may be used).

Figures 1, 5:
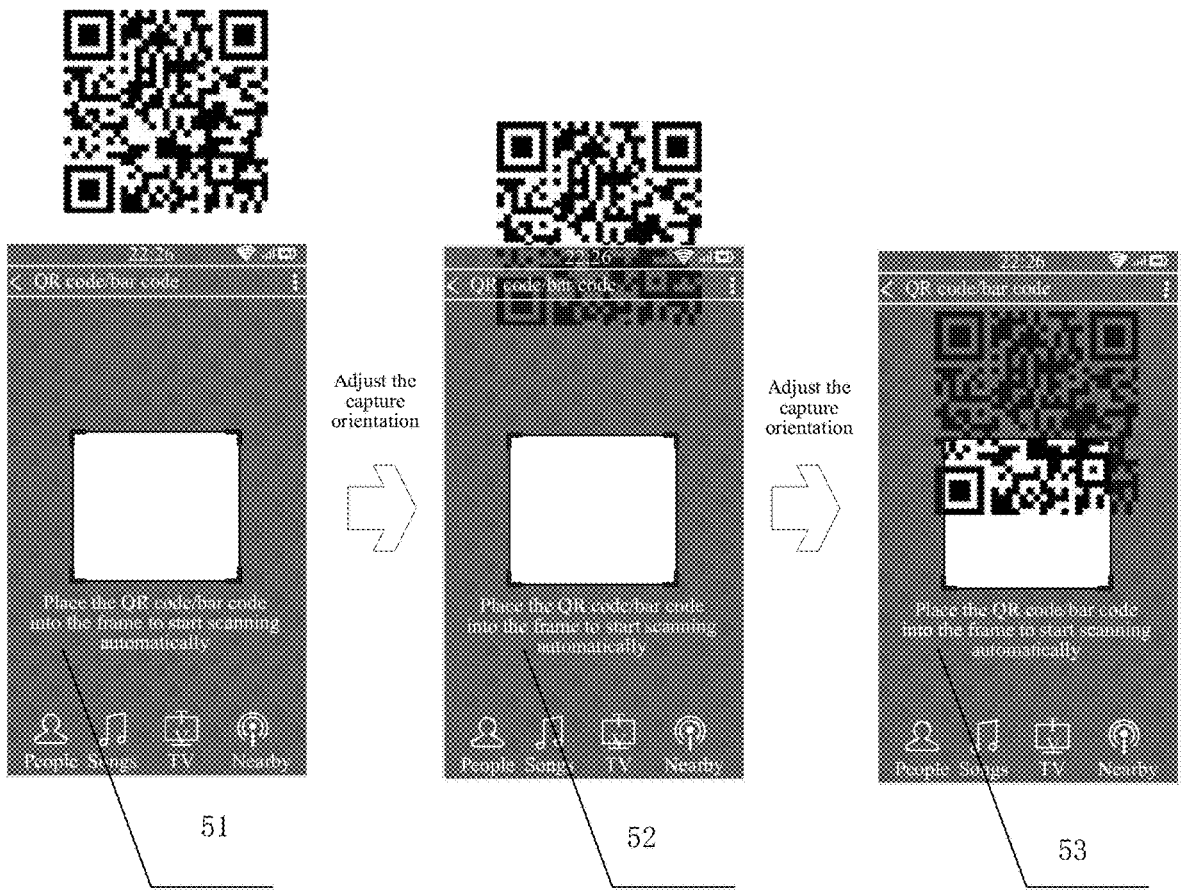
Figures 2, 5:
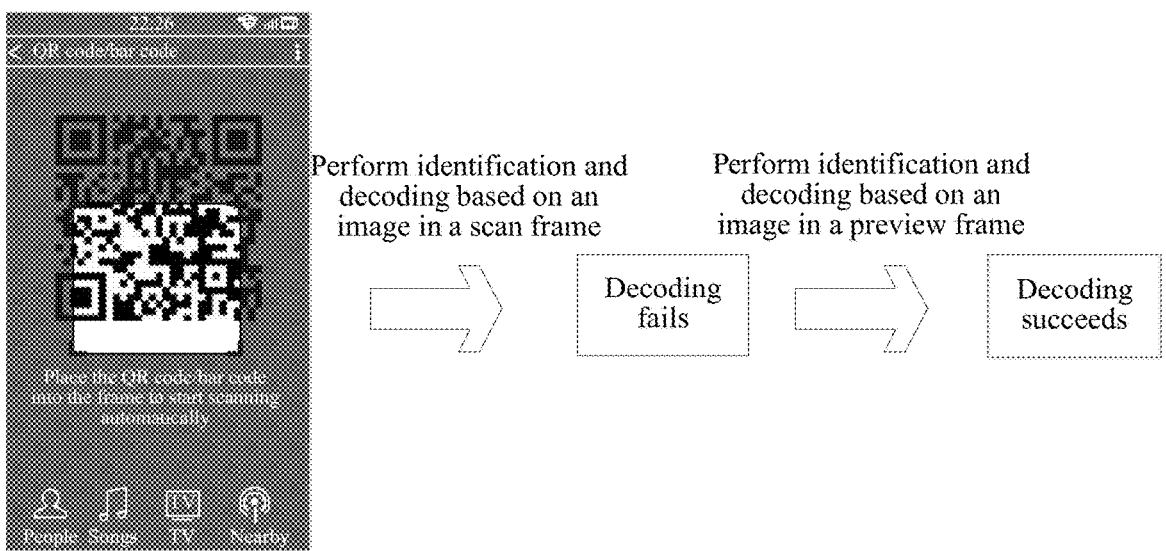
Figures 3, 5:
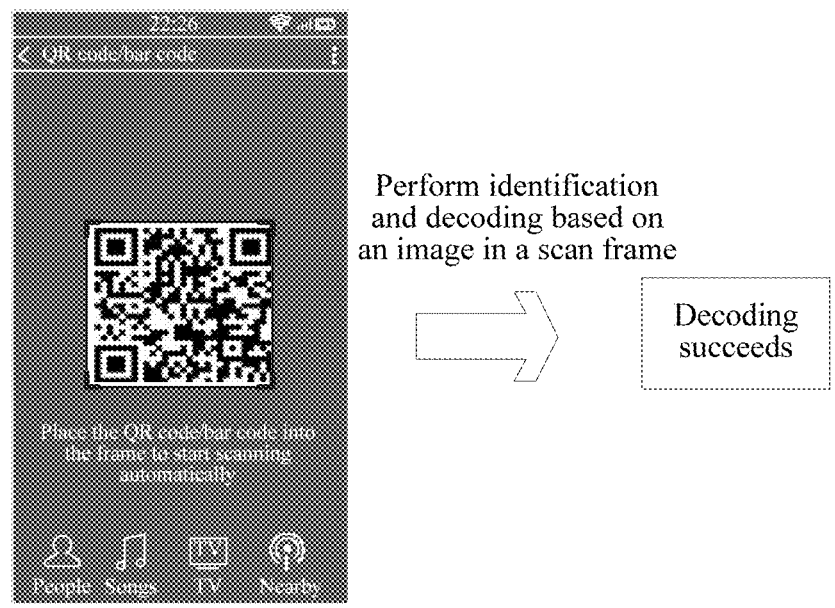

In actual application, complete imaging of the QR code in the preview interface includes the following situations: 1) as shown in FIG. 5-3, the QR code is completely imaged in the scan frame; 2) as shown in FIG. 5-2, the QR code is completely imaged in the preview interface, and is partially imaged in the scan frame; and 3) the QR code is completely imaged in regions in the preview interface except the scan frame.

The scanning device captures, by using a camera (for example, a built-in camera of the scanning device, or an external camera controlled in a wired or wireless manner), an environment including a graphic code, to form a stream consisting of frame images (referred to as images for short), and presents, in the preview interface, each image in the image stream in real time.

It should be noted that, the capture orientation of the scanning device is affected by a holding posture of the user. Therefore, after the scanning device starts capturing, the user is usually unable to quickly adjust the capture orientation of the camera called by the scanning device to make an image of the graphic code in the preview interface match the scan frame. For example, as shown in FIG. 5-1, an initial image presented in the preview interface may not include the graphic code; as the user adjusts the capture orientation of the scanning device, a part of the graphic code is presented in the preview interface, and finally the graphic code is completely imaged in the preview interface.

Step 203: Determining continuous distribution regions of pixels of a captured image in different reference directions, and identify an overlapping region of the continuous distribution regions as a potential distribution region of the graphic code.

Binarization processing is performed on the captured image, to determine continuous distribution regions which are in different reference directions such as an x-axis direction and a y-axis direction, of black pixels in a binary image of the captured image, and an overlapping region of the continuous distribution regions is identified as a potential distribution region of the graphic code in the corresponding image. The potential distribution region refers to a region which is most likely to have the graphic code among captured regions.

Step 204: Identifying a scanning step length from a partial image corresponding to the potential distribution region, and scanning the partial image based on the scanning step length to obtain a graphic code image.

The capture orientation of the scanning device is usually adjusted dynamically. The captured image inevitably includes other objects except the graphic code, such as scenery in the environment. Therefore, the potential distribution region of the image captured by the scanning device includes a region of the graphic code and may also include other objects.

In an embodiment, the step of identifying a scanning step length from a partial image corresponding to the potential distribution region, and scanning the partial image based on the scanning step length to obtain a graphic code image may be implemented through the followings.

Step (1): Obtaining, by analyzing the binary image of the partial image, a size of a symbol in the graphic code to serve as the scanning step length.

In an embodiment, dilation and erosion operations are performed on the binary image of the partial image; black pixel blocks (which are sets formed by continuously distributed black pixels) and accumulated numbers of occurrences of black pixel blocks having adjacent sizes are identified in the binary image of the partial image; sizes of black pixel blocks corresponding to a highest accumulated number of occurrences are determined; and further, a pixel block of a middle size in the black pixel blocks corresponding to the highest accumulated number of occurrences is used as the size of the symbol in the graphic code.

For example, when identifying the black pixel blocks in the binary image of the partial image and the number of occurrences of black pixel blocks having adjacent sizes, and determining the sizes of the black pixel blocks corresponding to the highest accumulated number of occurrences, the binary image of the partial image is sampled according to different reference directions to obtain bar images; lengths of continuous distribution regions in respective statistical histograms of the bar images are identified; the number of occurrences of each length and adjacent lengths in a length fluctuation range is counted; and lengths corresponding to a highest number of occurrences are selected as the sizes of the black pixel blocks corresponding to the highest number of occurrences.

Step (2): Scanning the partial image based on the scanning step length to obtain the graphic code image.

In an embodiment, the binary image of the partial image is scanned by using the size of the symbol as the scanning step length; a set of pixels that are obtained through scanning and meet a scan mode is mapped to the binary image of the partial image; and the set of pixels obtained through mapping is identified as the graphic code image. Before the binary image of the partial image is scanned by using the size of the symbol as the scanning step length, dilation and erosion operations may be performed on the binary image of the partial image to remove noise, so as to prevent the noise in the binary image from affecting the precision of the size of the symbol in the graphic code.

For example, when the binary image of the partial image is scanned by using the size of the symbol as the scanning step length, it is detected whether each black pixel in the binary image of the partial image is a black pixel meeting a predetermined scan mode, and it is detected whether a white pixel meeting the predetermined scan mode exists at a position having a distance of the scanning step length from the black pixel meeting the predetermined scan mode, so as to obtain a set of black pixels meeting the predetermined scan mode. The set of the black pixels meeting the predetermined scan mode is used as a set of pixels meeting the scan mode, thereby forming the graphic code image in the form of the set.

In addition, before the set of pixels that are obtained through scanning and meet the scan mode is mapped to the binary image of the partial image, denoising processing is performed on the set of the pixels based on histograms of the set of the pixels.

In this way, because each image captured by the scanning device has a different orientation, sizes of symbols corresponding to the graphic code in the image are also different. In this embodiment of the present disclosure, the binary image of the partial image can be analyzed to obtain the size of the symbol, therefore implementing an effect of adaptively determining a scanning step length of a graphic code in an image based on the capture orientation of each image in the image stream. Compared with the method of scanning a QR code in an image by using a fixed scanning step length, this embodiment of the present disclosure achieves a more precise scanning result.

Step 205: Performing adjustment until the size of the graphic code image is the same as the size of the scan frame, performing decoding processing based on the adjusted graphic code image, and determining whether decoding succeeds; if yes, performing step 206; otherwise, returning to step 203 to continue to process a next captured image.

Generally, the scanning device decodes a graphic code image having the same size as the scan frame. Because the size of the graphic code image in the scan frame is definite, a location mark of the graphic code can be determined rapidly and decoding can be performed efficiently. However, the size of the graphic code image identified in the preview interface is usually different from that of the scan frame. Therefore, the size of the graphic code image is adjusted to be the same as that of the scan frame, and then a scan frame-based code scanning processing scheme can be invoked, thereby laying the foundation for improving the decoding efficiency and precision of the graphic code.

Step 206: Stopping capturing the environment including the graphic code.

In an embodiment, after decoding succeeds, that is, after information modulated in the graphic code is obtained, at least one of step 207 and step 208 can be performed:

Step 207: Presenting information modulated in the graphic code.

For example, when the graphic code is a QR code name card, basic information such as a contact name modulated in the QR code is presented, or when the graphic code is a page address, address information modulated in the QR code is presented.

Step 208: Sending the information modulated in the graphic code to an instance requesting to scan the graphic code.

For example, when a page address is obtained by decoding a graphic code that a browser requests to scan, the page address is sent to the browser, so that the browser loads corresponding page data.

An actual application scenario of the foregoing graphic code processing method is described still with reference to an example of QR code scanning shown in FIG. 5-1. When a browser running on a scanning device used by a user needs to scan a website QR code, a code scanning function in the browser is started. A camera of the scanning device captures an image according to a current capture orientation. A scan frame is loaded in a preview interface, and an image in an image stream is presented in the preview interface in real time.

When the user starts the code scanning function, the capture orientation of the scanning device is not aligned with the graphic code, and therefore the graphic code is not imaged in the preview interface 51. The user adjusts the capture orientation of the scanning device, so that the graphic code forms a partial QR code image in the preview interface 52. As the capture orientation is corrected continuously, a complete QR code image is presented in the preview interface 53. Although the QR code image in the preview interface 53 is not completely located in the scan frame, as mentioned above, the QR code image can be decoded based on the disclosed graphic code processing method of the present disclosure, to obtain a page address modulated in the QR code. In this way, the method in this embodiment of the present disclosure overcomes the restriction in the related technology that in order to decode a QR code, a user needs to adjust the capture orientation of the scanning device continuously until a complete QR code image is presented in the scan frame, reduces the operation difficulty of QR code scanning, and improves the efficiency of QR code scanning.

In addition, for such a situation where the QR code needing to be scanned is located in a small space but has a large area, and the user cannot move to a position with a sufficiently far distance to the QR code so that an image of the graphic code in the preview interface is completely located in the scan frame, but it is relatively easy to make the QR code completely imaged in the preview interface. The QR code image in the preview interface 53 is decoded based on the foregoing graphic code processing method, thereby overcoming the restriction in the related technology that a QR code with an excessively large area cannot be scanned when scanning is performed based on the scan frame.

Moreover, for such a situation where the QR code needing to be scanned is located at a relatively high position, and the QR code cannot be completely imaged in the scan frame because the user cannot adjust the scanning device to a sufficiently high position, but it is relatively easy to adjust a capture height of the scanning device so that the QR code forms a complete image in the preview interface 53. Therefore, a restriction that a QR code with an excessively large area cannot be scanned is overcome.

In an embodiment, referring to a schematic flowchart of a graphic code processing method shown in FIG. 4-2, based on FIG. 4-1, before step 203, the method further includes the followings.

Step 209: Performing decoding processing based on the partial image that is formed in the scan frame the captured image, and detecting whether decoding succeeds; if yes, going to step 206 and performing step 207; otherwise, going to step 203.

An application scenario of the graphic code processing method shown in FIGS. 5-2 and 5-3 is described by using QR code scanning as an example. When a user uses a code scanning device to scan a QR code and the QR code cannot be completely imaged in a scan frame because the code scanning device is close to the QR code, a decoding attempt is first made based on a partial image in the scan frame. For the situation shown in FIG. 5-3, because the QR code is already completely imaged in the scan frame, decoding can succeed based on the partial image in the scan frame. For the situation shown in FIG. 5-2, decoding fails because the QR code is not completely imaged in the scan frame; then, a location of a potential distribution region of the QR code is determined in an image currently presented in a preview interface, the QR code is identified based on the potential distribution region and is decoded. Because the QR code is completely imaged in the preview interface in FIG. 5-3, information modulated in the QR code can be obtained through decoding.

It can be seen that, decoding is first attempted by using the image in the scan frame, and then decoding is attempted by using the image in the preview interface (that is, an image in the image stream currently presented in the preview interface). It is easier to determine a region where the QR code is located when decoding is performed based on the image in the scan frame. Therefore, the code scanning efficiency is higher than that of locating the QR code based the image in the preview interface and then decoding the QR code. On one hand, the scheme of decoding by first using the image in the scan frame can ensure the decoding efficiency. On the other hand, when decoding based on the image in the scan frame fails, an image in the preview interface is used for decoding, so that the decoding success rate can be improved as much as possible, avoiding the problem that the user adjusts the capture orientation frequently and the problem that due to restrictions of an environment, the QR code cannot be completely imaged in the scan frame no matter how the capture orientation is adjusted.

In addition, it should be noted that, in this embodiment of the present disclosure, a graphic code is decoded based on a captured image (optionally, a captured image presented in a preview interface). Therefore, loading a scan frame in the preview interface is not a necessary condition for implementing the foregoing graphic code processing method. For example, in another scenario, a user adjusts a capture orientation by using the preview interface, until the graphic code is completely imaged in the preview interface. In this case, whether the graphic code is imaged in the scan frame or not, identification and decoding can be performed based on the graphic code processing method shown in FIG. 4-1 and subsequent FIG. 6. Therefore, for a user, it is easier to make a graphic code completely imaged in a preview interface than to make a graphic code completely imaged in a scan frame (because the preview interface has a larger capture angle). The user does not need to align the scan frame with the graphic code, and therefore code scanning becomes easier.

Figure 6:
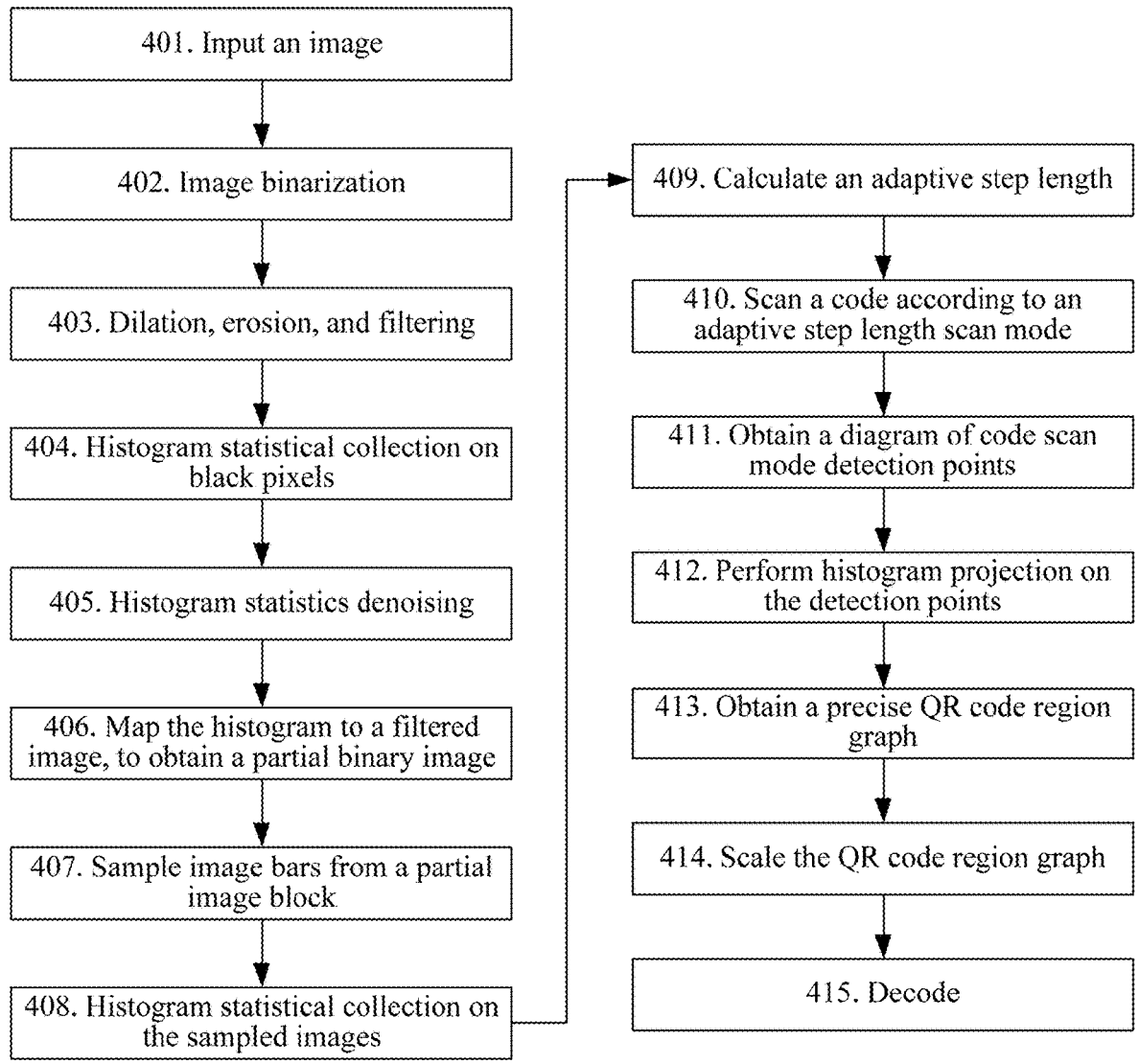
FIG. 6 is a schematic flowchart of a graphic code processing method according to an embodiment of the present disclosure.

With reference to a schematic flowchart of a graphic code processing method shown in FIG. 6, implementation of the foregoing graphic code processing method is described with reference to a specific example of QR code scanning. As shown in FIG. 6, the processing method includes the followings.

Step 401: Inputting an image, that is, capturing an image including a single QR code by using a camera of a code scanning device.

Step 402: Performing image binarization.

First, a binary threshold of the image is calculated according to a pixel value distribution of the whole image, and the image is binarized according to the binary threshold. Binarized images of the preview interfaces in FIG. 1-1, FIG. 1-2 and FIG. 1-3 are as shown in FIG. 7-1, FIG. 7-2 and FIG. 7-3.

Step 403: Performing dilation and erosion on a binarized image, to remove noise points in the image.

For example, after dilation filtering, the binary images shown in FIG. 7-1, FIG. 7-2 and FIG. 7-3 become images shown in FIG. 7-4, FIG. 7-5 and FIG. 7-6.

Step 404: Performing histogram statistical collection on a denoised image, and counts the number of black pixels in each row and the number of black pixels in each column (statistical data).

Figures 1, 7:
Figures 2, 7:
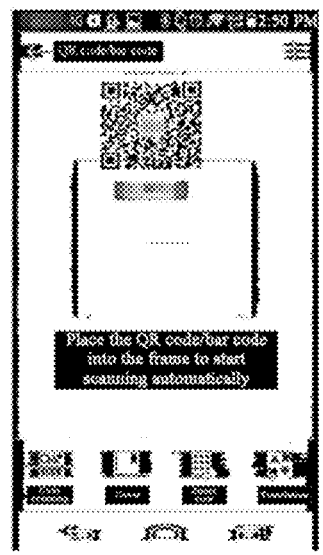
Figures 3, 7:
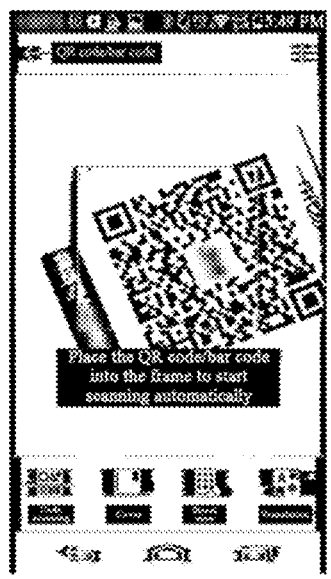
Figures 4, 7:
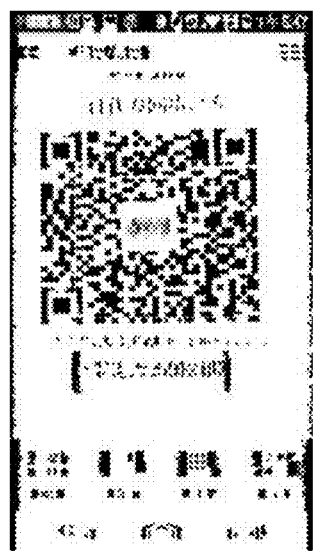
Figures 5, 7:
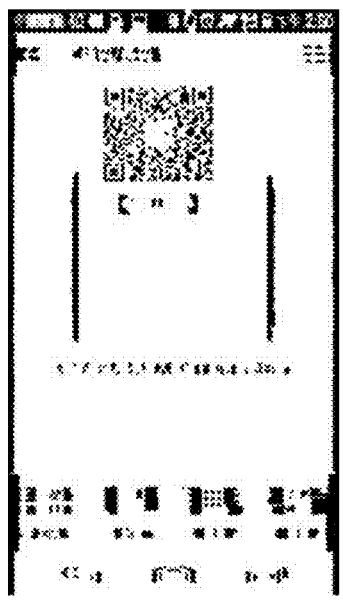
Figures 6, 7:
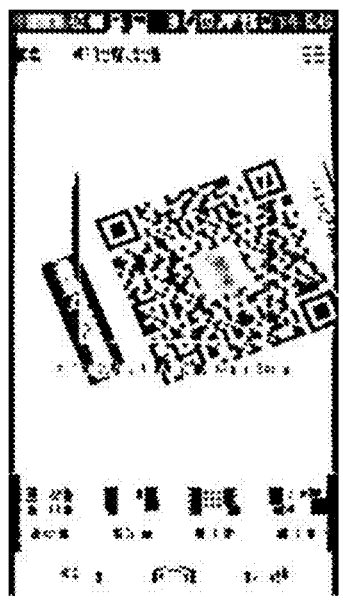
Figure 7:
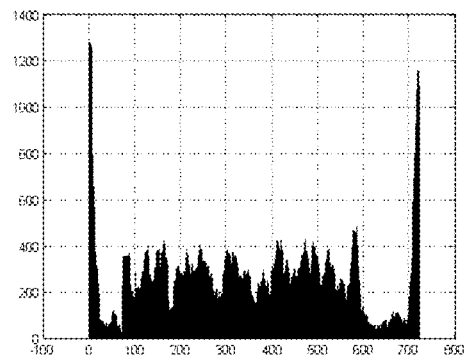
Figures 7, 8:
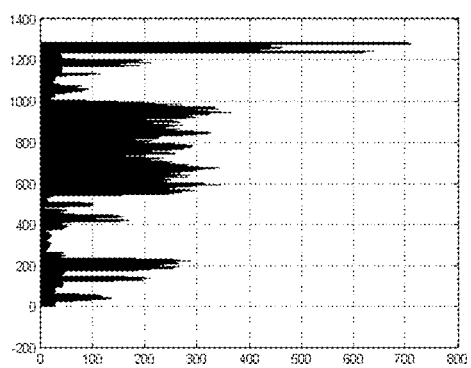
Figures 7, 8, 9:
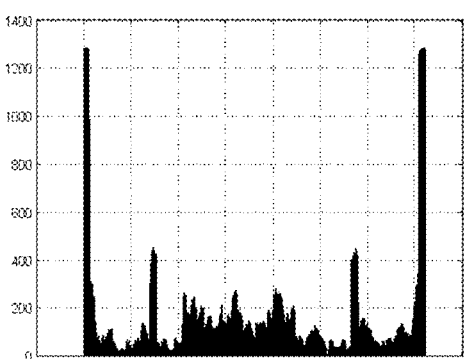
Figures 7, 8, 9, 10:
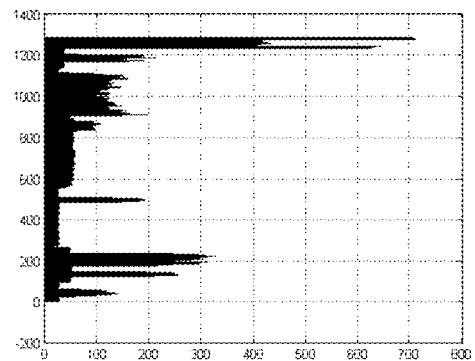
Figures 7, 8, 9, 10, 11:
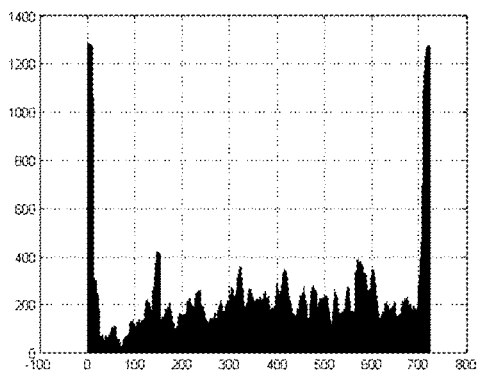
Figures 7, 8, 9, 10, 11, 12:
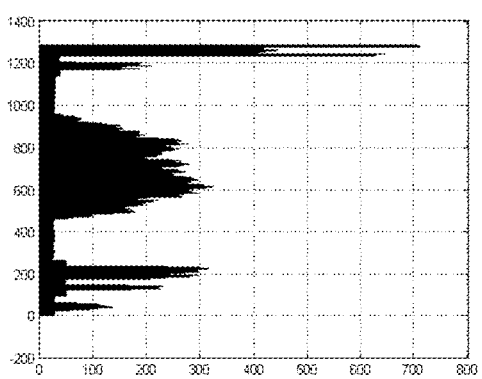
Figures 7, 8, 9, 10, 11, 12, 13:
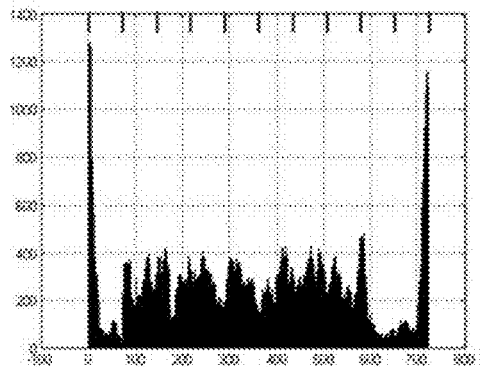
Figures 7, 8, 9, 10, 11, 12, 13, 14:
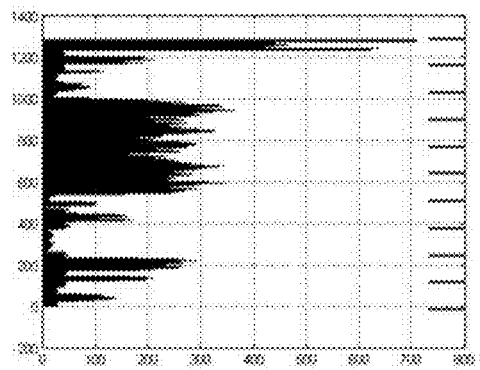
Figures 7, 8, 9, 10, 11, 12, 13, 14, 15:
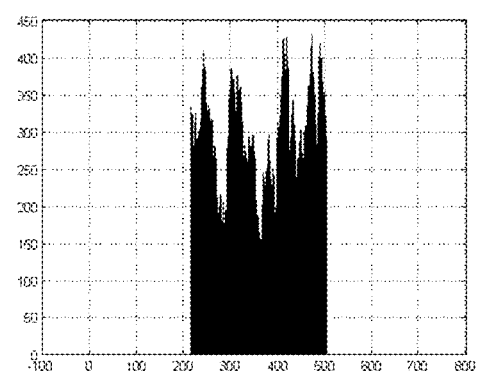
Figures 7, 8, 9, 10, 11, 12, 13, 14, 15, 16:
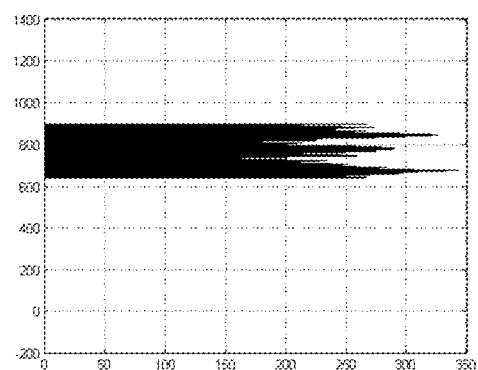
Figures 7, 8, 9, 10, 11, 12, 13, 14, 15, 16, 17:
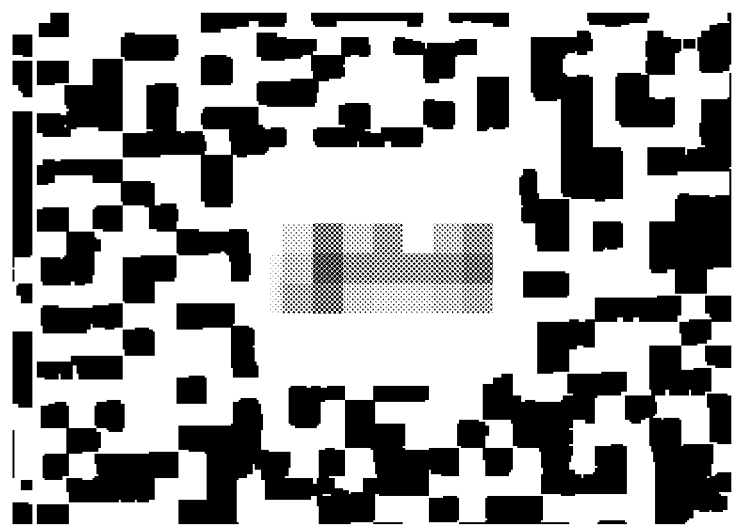
Figures 7, 8, 9, 10, 11, 12, 13, 14, 15, 16, 17, 18:
Figures 7, 8, 9, 10, 11, 12, 13, 14, 15, 16, 17, 18, 19:
Figures 7, 8, 9, 10, 11, 12, 13, 14, 15, 16, 17, 18, 19, 20:
Figures 7, 8, 9, 10, 11, 12, 13, 14, 15, 16, 17, 18, 19, 20, 21:
Figures 7, 8, 9, 10, 11, 12, 13, 14, 15, 16, 17, 18, 19, 20, 21, 22:
Figures 7, 8, 9, 10, 11, 12, 13, 14, 15, 16, 17, 18, 19, 20, 21, 22, 23:
Figures 7, 8, 9, 10, 11, 12, 13, 14, 15, 16, 17, 18, 19, 20, 21, 22, 23, 24:
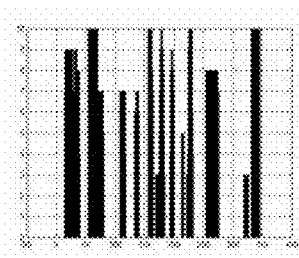
Figures 7, 8, 9, 10, 11, 12, 13, 14, 15, 16, 17, 18, 19, 20, 21, 22, 23, 24, 25:
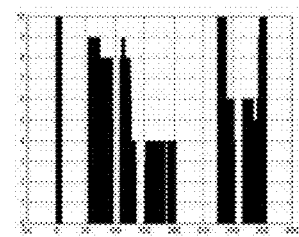
Figures 7, 8, 9, 10, 11, 12, 13, 14, 15, 16, 17, 18, 19, 20, 21, 22, 23, 24, 25, 26:
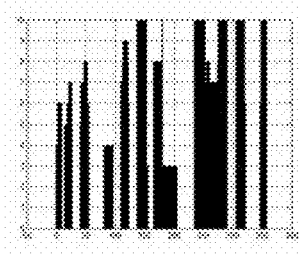
Figures 7, 8, 9, 10, 11, 12, 13, 14, 15, 16, 17, 18, 19, 20, 21, 22, 23, 24, 25, 26, 27:
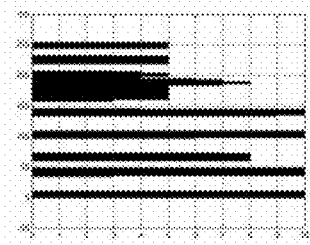
Figures 7, 8, 9, 10, 11, 12, 13, 14, 15, 16, 17, 18, 19, 20, 21, 22, 23, 24, 25, 26, 27, 28:
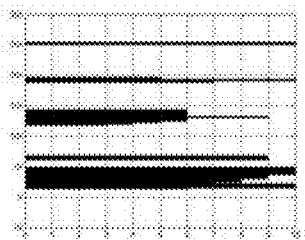
Figures 7, 8, 9, 10, 11, 12, 13, 14, 15, 16, 17, 18, 19, 20, 21, 22, 23, 24, 25, 26, 27, 28, 29:
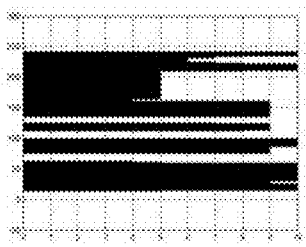
Figures 7, 8, 9, 10, 11, 12, 13, 14, 15, 16, 17, 18, 19, 20, 21, 22, 23, 24, 25, 26, 27, 28, 29, 30:
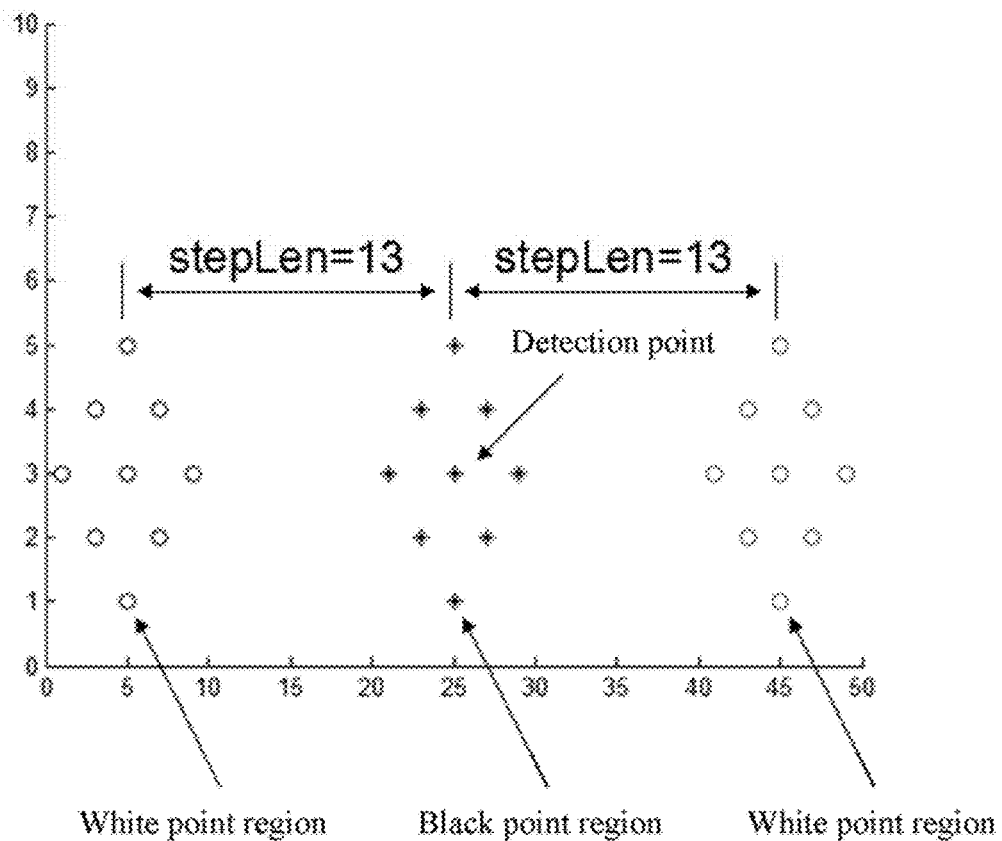
Figures 7, 8, 9, 10, 11, 12, 13, 14, 15, 16, 17, 18, 19, 20, 21, 22, 23, 24, 25, 26, 27, 28, 29, 30, 31:
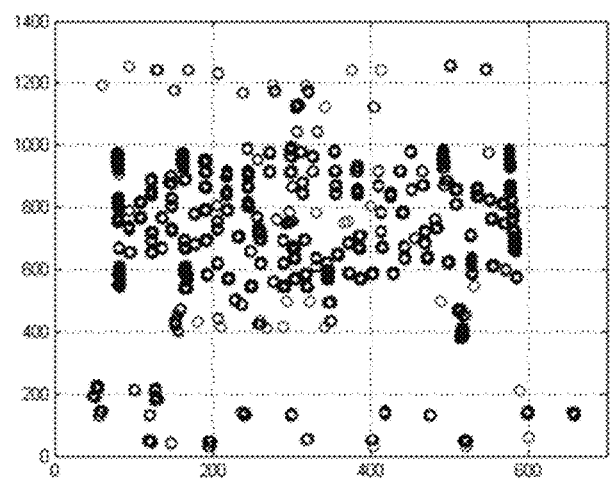
Figures 7, 8, 9, 10, 11, 12, 13, 14, 15, 16, 17, 18, 19, 20, 21, 22, 23, 24, 25, 26, 27, 28, 29, 30, 31, 32:
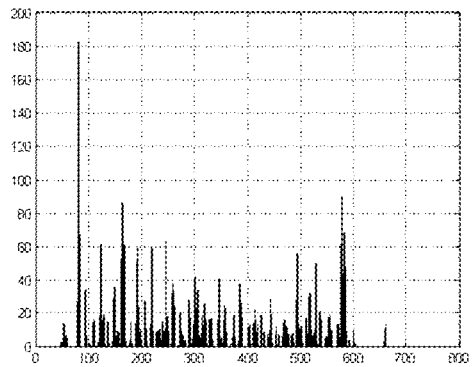
Figures 7, 8, 9, 10, 11, 12, 13, 14, 15, 16, 17, 18, 19, 20, 21, 22, 23, 24, 25, 26, 27, 28, 29, 30, 31, 32, 33:
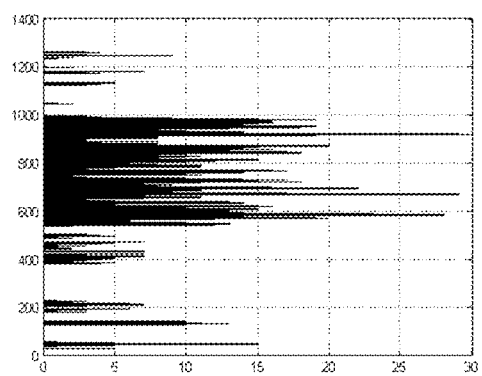
Figures 7, 8, 9, 10, 11, 12, 13, 14, 15, 16, 17, 18, 19, 20, 21, 22, 23, 24, 25, 26, 27, 28, 29, 30, 31, 32, 33, 34:
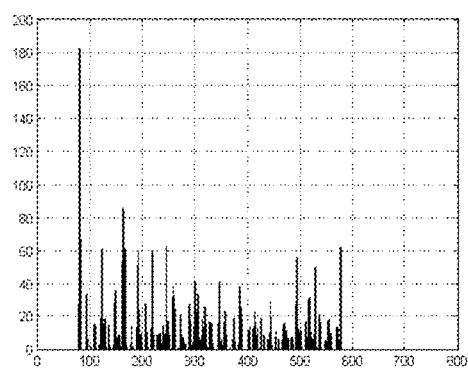
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35:
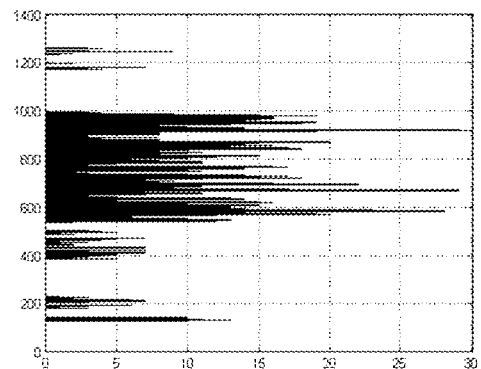
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
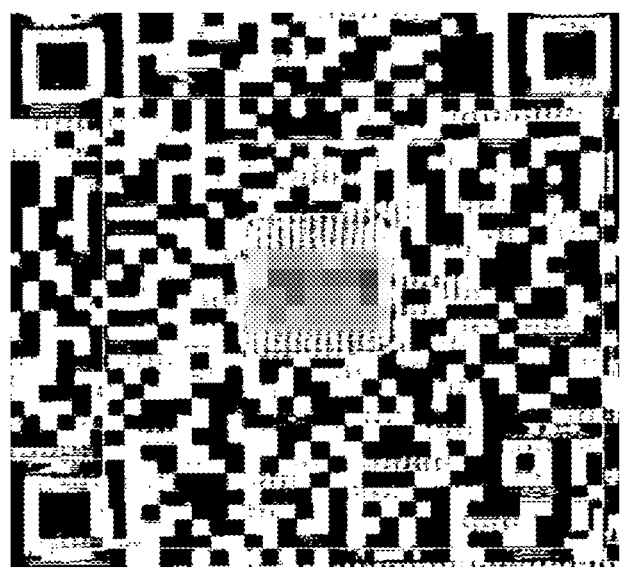
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
Figures 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
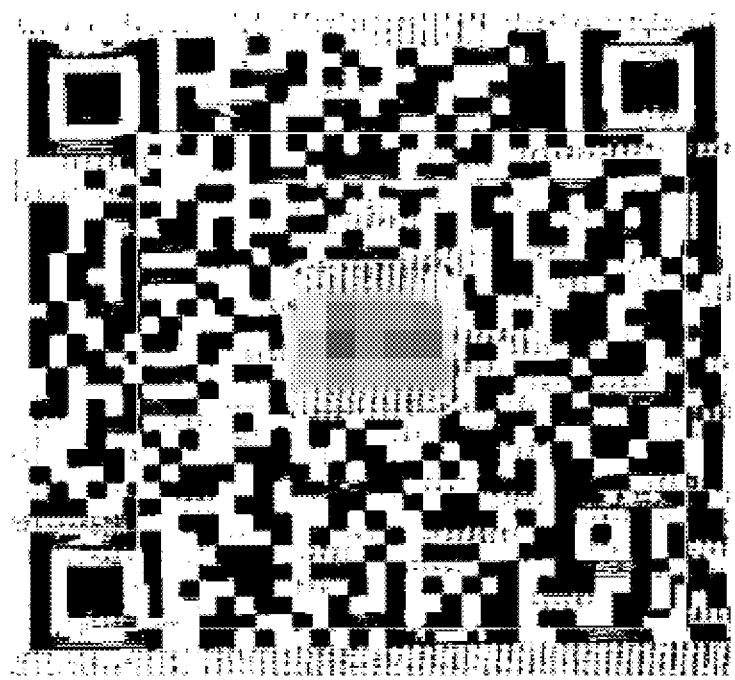
Figures 1, 8:
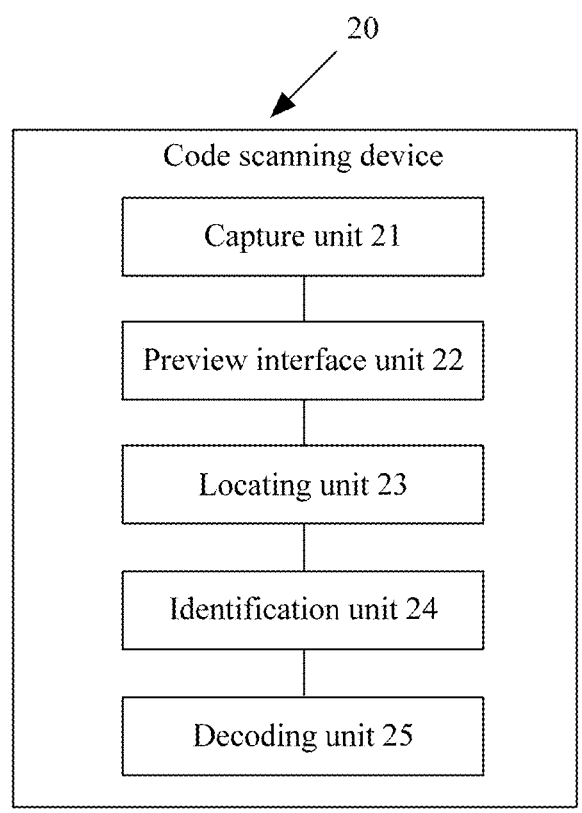
Figures 2, 8:
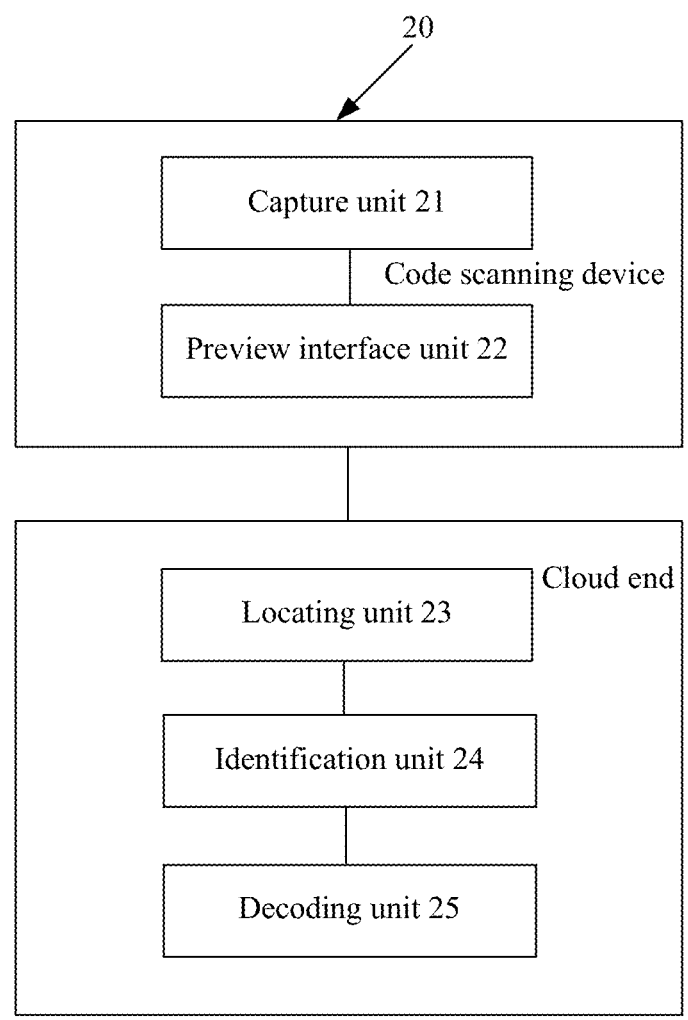

For example, statistical histograms of black pixels in each row of the binary image shown in FIG. 7-4 are as shown in FIG. 7-7 and FIG. 7-8 correspondingly; statistical histograms of black pixels in each row of the binary image shown in FIG. 7-5 are as shown in FIG. 7-9 and FIG. 7-10 correspondingly; and statistical histograms of black pixels in each row of the binary image shown in FIG. 7-6 are as shown in FIG. 7-11 and FIG. 7-12 correspondingly.

Step 405: Performing denoising on the black pixel histograms according to a histogram denoising algorithm.

In order to find a region where the QR code image is most likely located according to the black pixel statistical histogram, interference statistics in the histogram need to be removed first. A denoising algorithm for histogram statistical data provided in this embodiment of the present disclosure is as follows.

(1) A histogram is divided into n equal divisions, and it is temporarily set that n=10. Each equal division is divided into a left half part and a right half part. When the difference between statistical data in the left part and right half part of an equal division is a (e.g., a=3) times of a smaller half part, the statistical data in the equal division is set to 0, and statistical data in an equal division where a maximum value is b times (e.g., b=4) or greater of a minimum value is set to 0.

This step can be expressed as follows: rightHistSum represents a right half part in each equal division of the histogram, and leftHistSum represents a left half part in each equal division of the histogram; maxHist represents a maximum value in each equal division of the histogram, and minHist represents a minimum value in each equal division of the histogram.

when rightHistSum>leftHistSum, errorRightLeft=rightHistSum−leftHistSum; and if: errorRightLeft/leftHistSum>3, all histogram statistical values in the equal division are set to 0; or when maxHist/minHist>4, all histogram statistical values in the equal division are set to 0.

(2) If all statistical values in left and right adjacent blocks of an equal division block are set to 0, all statistical values in the equal division block are also set to 0. It is assumed that in the 10 equal divisions, an equal division in which all statistical values can be set to 0 is marked as '1', and an equal division in which all statistical values of original statistical data are remained unchanged is marked as '1'. In this case, in histogram equal divisions meeting a mark pattern of '101', all statistical values in the equal division marked as '0' in '101', i.e., the equal division in which the histogram statistical data is originally remained, also need to be set to 0.

(3) A ratio between a normal signal and an adjacent noise in equal division blocks is calculated. Data blocks with smaller signal-to-noise ratios are removed, and data blocks with a maximum signal-to-noise ratio are kept. It is assumed that kept histogram statistical blocks are equal division block 2, equal division block 3, and equal division block 4; equal division block 1 and equal division block 5 are both set to 0; a total statistical value of equal division block 2 is a, a total statistical value of equal division block 4 is b, a total statistical value of equal division block 1 is c, and a total statistical value of equal division block 5 is d. In this case:

a signal-to-noise ratio between equal division block 2 and equal division block 1 is: $z1=a/c$; and a signal-to-noise ratio between equal division block 4 and equal division block 5 is: $z2=b/d$.

Thus, a denoised statistical histogram is obtained after noises are removed.

Step 406: For the formed entire histogram connected region, the entire histogram connected region is mapped back as a whole to the dilated and erosion (filtering) image, and an image block corresponding to the entire connected region in the image is extracted, to obtain a partial binary image.

Using the statistical histograms shown in FIG. 7-7 and FIG. 7-8 as an example, the statistical histograms are divided into n equal divisions as shown in FIG. 7-13 and FIG. 7-14, and it is temporarily set that n=10. In FIG. 7-13, the 10 equal divisions are marked as equal division 1, equal division 2, equal division 3, equal division 4 . . . , equal division 10 from left to right.

In equal division 1, a statistical sum of the left half part is: 17372, a statistical sum of the right half part is: 2644, the maximum value is: 1276, and the minimum value is: 30.

In equal division 2, a statistical sum of the left half part is: 9162, a statistical sum of the right half part is: 10568, the maximum value is: 398, and the minimum value is: 25.

In equal division 3, a statistical sum of the left half part is: 10657, a statistical sum of the right half part is: 9879, the maximum value is: 421, and the minimum value is: 111.

In equal division 4, a statistical sum of the left half part is: 11269, a statistical sum of the right half part is: 8966, the maximum value is: 408, and the minimum value is: 154.

In equal division 5, a statistical sum of the left half part is: 11301, a statistical sum of the right half part is: 9363, the maximum value is: 384, and the minimum value is: 164.

In equal division 6, a statistical sum of the left half part is: 7654, a statistical sum of the right half part is: 12156, the maximum value is: 426, and the minimum value is: 146.

In equal division 7, a statistical sum of the left half part is: 10010, a statistical sum of the right half part is: 12871, the maximum value is: 430, and the minimum value is: 228.

In equal division 8, a statistical sum of the left half part is: 10326, a statistical sum of the right half part is: 8773, the maximum value is: 394, and the minimum value is: 42.

In equal division 9, a statistical sum of the left half part is: 8129, a statistical sum of the right half part is: 2199, the maximum value is: 483, and the minimum value is: 28.

In equal division 10, a statistical sum of the left half part is: 3179, a statistical sum of the right half part is: 15489, the maximum value is: 1154, and the minimum value is: 46.

Statistical sums of equal division 1 to equal division 10 from left to right in FIG. 7-13 are:

20016; 19730; 20536; 20235; 20664; 19810; 22881; 19099; 10328; 18668.

According to the first step of the histogram denoising algorithm, equal divisions that can be set to 0 in the 10 equal divisions are marked as 1, and equal divisions in which original statistical data is remained unchanged are marked as 0. Then, marking results of equal division 1 to equal division 10 from left to right in FIG. 7-13 are as follows:

1; 1; 0; 0; 0; 0; 0; 1; 1; 1.

There is no 101 mark pattern in the marks, and therefore it is unnecessary to remove the independent block statistical diagram.

A signal-to-noise ratio between block 3 and block 2 is: $z1=20536/19730=1.04$.

A signal-to-noise ratio between block 7 and block 8 is: $z2=22881/19099=1.198$.

In FIG. 7-14, 10 equal divisions are marked as: equal division 1, equal division 2, equal division 3, equal division 4 . . . , equal division 10 from top to bottom.

In equal division 1, a statistical sum of the left half part is: 4509, a statistical sum of the right half part is: 2577, the maximum value is: 177, and the minimum value is: 0.

In equal division 2, a statistical sum of the left half part is: 7892, a statistical sum of the right half part is: 11714, the maximum value is: 289, and the minimum value is: 39.

In equal division 3, a statistical sum of the left half part is: 1114, a statistical sum of the right half part is: 1167, the maximum value is: 45, and the minimum value is: 5.

In equal division 4, a statistical sum of the left half part is: 5825, a statistical sum of the right half part is: 3346, the maximum value is: 170, and the minimum value is: 9.

In equal division 5, a statistical sum of the left half part is: 8609, a statistical sum of the right half part is: 16759, the maximum value is: 346, and the minimum value is: 9.

In equal division 6, a statistical sum of the left half part is: 17127, a statistical sum of the right half part is: 13688, the maximum value is: 342, and the minimum value is: 134.

In equal division 7, a statistical sum of the left half part is: 14353, a statistical sum of the right half part is: 16442, the maximum value is: 326, and the minimum value is: 109.

In equal division 8, a statistical sum of the left half part is: 17223, a statistical sum of the right half part is: 10382, the maximum value is: 363, and the minimum value is: 20.

In equal division 9, a statistical sum of the left half part is: 3461, a statistical sum of the right half part is: 2928, the maximum value is: 115, and the minimum value is: 24.

In equal division 10, a statistical sum of the left half part is: 6838, a statistical sum of the right half part is: 26013, the maximum value is: 708, and the minimum value is: 23.

Statistical sums of equal division 1 to equal division 10 from top to bottom in FIG. 7-14 are:

7086; 19606; 2281; 9171; 25368; 30815; 30795; 27605; 6389; 32851.

According to the first step of the histogram denoising algorithm, equal divisions that can be set to 0 in the 10 equal divisions are marked as 1, and equal divisions in which original statistical data is remained unchanged are marked as 0. Then, marking results of equal division 1 to equal division 10 from top to bottom in FIG. 7-14 are as follows:

1; 1; 1; 1; 1; 0; 0; 1; 1; 1.

There is no 101 mark pattern in the marks, and therefore it is unnecessary to remove an independent block statistical diagram.

A signal-to-noise ratio between block 6 and block 5 is: $z1=30815/25368=1.215$.

A signal-to-noise ratio between block 7 and block 8 is: $z2=30795/27605=1.115$.

Interference data in statistics is removed according to the histogram statistical data denoising algorithm, to obtain denoised histograms as shown in FIG. 7-15 and FIG. 7-16. A column statistical range kept in FIG. 7-15 is 144 to 503, and a row statistical range kept in FIG. 7-16 is 640 to 895. An image block in an intersection range between the row statistical range and the column statistical range is as shown in FIG. 7-17.

Step 407: Sampling bar images from the partial image.

Step 408: Obtaining six bar images sampled from the partial image, performing x-axis histogram statistical collection on three row sample images of the six images, and performing y-axis statistical collection on three column samples. This step includes the following sub-steps:

(1) An image block is extracted in the middle along a row direction, where the width of the image block is the width of an image in a boundary region, and the height of the image block is b, which is temporarily set to 10 pixels and is adjustable. Dilation and erosion processing is performed on the image, to obtain an image as shown in FIG. 7-18.

(2) An image as shown in FIG. 7-19 is extracted in the middle along a column direction, where the width of the image block is a, which is temporarily set to 10 pixels and is adjustable, and the height of the image block is the height of the image extracted based on the statistical boundary.

(3) The image in the boundary region is divided from the middle into an upper elongated region and a lower elongated region along the row direction. At a ½ position in each elongated region, a bar image block is further extracted along the row direction, as shown in FIG. 7-20 and FIG. 7-21. The width of the image block is the width of the image in the boundary region, and the height of the image block is b, which is temporarily set to 20 pixels and is adjustable.

(4) The image in the boundary region is divided from the middle into a left elongated region and a right elongated region along the column direction. At a ½ position in each elongated region, a bar image block is further extracted along the column direction, as shown in FIG. 7-22 and FIG. 7-23. The width of the image block is a, which is temporarily set to 20 pixels and is adjustable, and the height of the image block is the height of the image extracted based on the statistical boundary.

The adaptive step length is calculated by using the following method, provided that, six small image region blocks are obtained based on the algorithm, including three image blocks in the row direction and three image blocks in the column direction.

(1) Performing histogram statistical collection on black pixels in the images in the row direction, and statistical values thereof are recorded on the x-coordinate axis.

(2) Performing histogram statistical collection on black pixels in the images in the row direction, and statistical values thereof are recorded on the y-coordinate axis.

(3) Based on lengths, collecting statistics about line segments formed by connected statistical values on the x-axis and y-axis, to obtain the statistical count of each line segment.

(4) Calculating a total of line segment lengths within a range of a length fluctuation value h (e.g., h=2) around the length value of each line segment, and recording the numeral on the length value.

(5) Adding a statistical value in the length fluctuation value of the line segment length value itself with a statistical value in a range of a left-right adjacent length fluctuation value h2 (e.g., h2=1), and selecting a length with a maximum sum as the adaptive step length.

For example: statistical histograms of FIG. 7-18, FIG. 7-20 and FIG. 7-21 on the x-axis are as shown in FIG. 7-24, FIG. 7-25 and FIG. 7-26.

Statistical histograms of FIG. 7-19, FIG. 7-22 and FIG. 7-23 on the y-axis are as shown in FIG. 7-27, FIG. 7-28 and FIG. 7-29.

In FIG. 7-24, length values of line segments from left to right on the x-axis are:

26; 26; 10; 7; 9; 16; 6; 3; 12; 22; 7; 16.

In FIG. 7-25, length values of line segments from left to right on the x-axis are:

10; 42; 27; 34; 14; 30; 41.

In FIG. 7-26, length values of line segments from left to right on the x-axis are: 11; 14; 15; 16; 14; 19; 39; 55; 17; 12.

In FIG. 7-27, length values of line segments from top to bottom on the y-axis are:

11; 15; 50; 12; 13; 14; 16; 12.

In FIG. 7-28, length values of line segments from top to bottom on the y-axis are:

5; 10; 26; 8; 36.

In FIG. 7-29, length values of line segments from top to bottom on the y-axis are:

104; 14; 24; 48.

Step 409: Counting the numbers of lengths according to continuous segment lengths formed through histogram statistical collection, and calculating an adaptive step length according to an adaptive step length statistical algorithm.

Statistics about the foregoing length values are collected by using a length fluctuation value of 2 and a length fluctuation value of 3 respectively, and obtained statistical counts are as shown in Table 1 below:

TABLE 1

| line segment length value | Number of line segments within a range of line segment length fluctuation value of 2 | Number of line segments within a range of line segment length fluctuation value of 3 |
| --- | --- | --- |
|  | 2 | 3 |
| 5 | 5 | 6 |
| 6 | 6 | 7 |
| 7 | 7 | 10 |
| 8 | 8 | 10 |
| 9 | 9 | 14 |
| 10 | 11 | 14 |
| 11 | 11 | 16 |
| 12 | 15 | 18 |
| 13 | 14 | 21 |
| 14 | 16 | 19 |
| 15 | 13 | 17 |
| 16 | 12 | 14 |
| 17 | 8 | 13 |
| 19 | 2 | 7 |
| 22 | 1 | 1 |
| 24 | 5 | 6 |
| 26 | 5 | 5 |
| 27 | 4 | 6 |
| 30 | 1 | 2 |
| 34 | 2 | 2 |
| 36 | 2 | 3 |
| 39 | 2 | 4 |
| 41 | 3 | 3 |
| 42 | 2 | 3 |
| 48 | 2 | 2 |
| 55 | 1 | 1 |
| 104 | 1 | 1 |

Statistical values corresponding to the length fluctuation value of 2 are taken, and a sum of statistical data within a fluctuation range of 1 around a line segment length is calculated:

It can be obtained that a statistical sum of three lengths, that is, the line segment length 13 and the lengths 12 and 14 within a fluctuation range of 1 around the length 13, is:

15+14+16=45, where 45 is a maximum value. Therefore, the length 13 is selected as the adaptive step length.

Step 410: Scanning the filtered binary image row by row based on a QR code scan mode with the adaptive step length as a unit.

Step 411: Obtaining a point diagram of a QR code region.

Detecting the coverage of the QR code:

After the QR code detection step length is obtained, the whole image is scanned according to the following scan mode, so as to obtain a set of a region where the QR code is located. The scan mode of the QR code is as shown in FIG. 7-30:

Description of the scan mode:

(1) in the scan mode, pixel values of detection points should be 0, that is, the detection points should be black points; and (2) in the scan mode, there are a black point with a distance of two pixels above the detection point and a black point with a distance of two pixels below the detection point; there are four black points in the diagonal direction of the detection point, where the black points are located at positions with a 2-pixel distance in the row direction and a 1-pixel distance in the column direction; there are a black point with a distance of four pixels to the left of the detection point and a black point with a distance of four pixels to the right of the detection point.

In the scan mode, there is an auxiliary point at each position with a distance of a detection step length stepLen from the detection point, where a pixel value of the auxiliary point is 255, that is, the auxiliary point is a white point. Eight white points should be distributed around the auxiliary point, and a distribution rule of the white points is the same as that of the points distributed around the detection point, as shown in FIG. 7-30.

FIG. 7-4 is scanned according to the scan mode, to obtain data points having characteristics of the QR code, as shown in FIG. 7-31.

Step 412: Performing histogram statistical collection on rows and columns in the point diagram of the QR code region, to obtain largest block statistical region.

Histogram statistical collection is performed on QR code points detected according to the scan mode, as shown in FIG. 7-32 and FIG. 7-33. Images of the denoised histograms are as shown in FIG. 7-34 and FIG. 7-35.

Step 413: Mapping back to the binary image, to obtain a precise QR code image block.

According to the x-axis range of 79 to 576 and the y-axis range of 539 to 993 of the largest block region of the histogram, that is, the width of 497 and the height of 454, the region is mapped to the binary image, as shown in FIG. 7-36.

Step 414: Performing scaling according to the size ratio between the QR code image block and the scan frame.

Step 415: Scaling the QR code image block to be an image of a size recognizable to the scan frame, thereby completing the process of adaptive location and identification of a single QR code.

In order to retain more boundary information, the x-axis and y-axis range is expanded as follows: the x-axis range is 59 to 596, and the y-axis range is 519 to 1013; a corresponding image is as shown in FIG. 7-37.

The size of the original scan frame is as follows: the width is 409 and the height is 370. Therefore, it can be obtained through calculation that the scaling ratio of the extracted QR code image is as follows: width scaling ratio=width of the scan frame/width of the extracted QR code image=409/497=0.82; and height scaling ratio=height of the scan frame/height of the extracted QR code image=370/454=0.81.

Therefore, the scaling ratio is set to 0.7, and the extracted QR code image (FIG. 7-37) is shrunk to be 70% of the original size, to obtain an image as shown in FIG. 7-38.

The original image has a size of 537*494, and the image after scaling has a size of 375*345. The image after scaling does not exceed the scan frame region: 409*370.

The functional structure of the foregoing graphic code processing apparatus is further described. Referring to a schematic diagram of an optional functional structure shown in FIGS. 8-1 and 8-2, the graphic code processing apparatus includes a capture unit 21, a preview interface unit 22, a locating unit 23, an identification unit 24, and a decoding unit 25.

The capture unit 21 may be implemented by a camera module including a camera and is configured to capture an environment including a graphic code. The preview interface unit 22 is configured to load a scan frame in a preview interface, and present, in the preview interface, an image in a captured image stream.

The locating unit 23 is configured to determine continuous distribution regions of pixels of a captured image in different reference directions, and identify an overlapping region of the continuous distribution regions as a potential distribution region of the graphic code.

The identification unit 24 is configured to identify a scanning step length from a partial image corresponding to the potential distribution region, and scan the partial image based on the scanning step length to obtain a graphic code image. The decoding unit 25 is configured to attempt decoding processing based on the graphic code image, until decoding succeeds and information modulated in the graphic code is obtained.

In actual application, except the capture unit 21, other functional units in the graphic code processing apparatus, that is, the preview interface unit 22, the locating unit 23, the identification unit 24 and the decoding unit 25 can be implemented by the processor 11 shown in FIG. 3 through running the executable instructions in the storage medium 14. As shown in FIG. 8-1, the functional units in the graphic code processing apparatus can be implemented on a code scanning device (such as a smart phone) side. In other words, the capture of the image including the graphic code, and the location, identification, and decoding of the graphic code can be completed on the mobile terminal side. Further, as shown in FIG. 8-2, the functional units in the graphic code processing apparatus 20 can be implemented on the code scanning device side and a server side that is located at a cloud end. The code scanning device is responsible for capturing an image including a graphic code; the server at the cloud end is responsible for locating, identifying, and decoding the graphic code, and sending a decoding result to the code scanning device. The capture unit 21 can be implemented by a camera.

In an embodiment, the decoding unit 25 is configured to: before the potential distribution region of the graphic code is located in the image captured by the capture unit 21, perform decoding processing based on a partial image that is formed in the scan frame of the preview interface by the image, and detect that decoding fails.

In an embodiment, the decoding unit 25 is configured to: before the potential distribution region of the graphic code is located in the image captured by the capture unit 21, perform decoding based on a partial image that is formed in the scan frame of the preview interface by the image; and the capture unit 25 is further configured to: when the information modulated in the graphic code is obtained through decoding by the decoding unit 25, stop capturing the environment including the graphic code.

In an embodiment, the decoding unit 25 is configured to perform adjustment until a size of the graphic code image is the same as a size of the scan frame, and perform decoding processing based on the adjusted graphic code image.

In an embodiment, the decoding unit 25 is configured to present the information modulated in the graphic code, and/or send the information modulated in the graphic code to an instance requesting to scan the graphic code.

In an embodiment, when determining continuous distribution regions of pixels of a captured image in different reference directions, and identifying an overlapping region of the continuous distribution regions as a potential distribution region of the graphic code, the locating unit 23 may use the following process: determining continuous distribution regions, which are in different reference directions, of black pixels in a binary image of the image captured by the capture unit, and identifying an overlapping region of the continuous distribution regions as a potential distribution region of the graphic code in the corresponding image.

In an embodiment, when determining continuous distribution regions, which are in different reference directions, of black pixels in a binary image of the image, the locating unit 23 may use the following process: determining statistical histograms, which correspond to different reference directions, of the black pixels in the binary image of the image, denoising the statistical histograms, and mapping continuous distribution regions in each denoised statistical histogram to regions in the binary image of the corresponding image.

In an embodiment, when denoising the statistical histograms, the locating unit 23 may use the following process: equally dividing the statistical histograms along the corresponding reference directions to obtain equal division blocks, and setting statistical data in an equal division block meeting a predetermined condition to zero.

In an embodiment, the setting, by the locating unit 23, statistical data in an equal division block meeting a predetermined condition to zero includes at least one of the following: when a difference degree of the statistical data in the equal division block exceeds a threshold, setting the statistical data in the corresponding equal division block to zero; when statistical data in adjacent equal division blocks of the equal division block is zero, setting the statistical data in the corresponding equal division block to zero; when a signal-to-noise ratio between the equal division block and an adjacent equal division block is a minimum signal-to-noise ratio between adjacent equal division blocks, setting the statistical data in the corresponding equal division block to zero.

In an embodiment, when identifying a scanning step length from a partial image corresponding to the potential distribution region, the locating unit 23 may use the following process: performing dilation and erosion operations on a binary image of the partial image, identifying black pixel blocks in the binary image of the partial image and accumulated numbers of occurrences of black pixel blocks having adjacent sizes, and identifying a scanning step length based on sizes of black pixel blocks corresponding to a highest accumulated number of occurrences.

In an embodiment, when identifying black pixel blocks in the binary image of the partial image and accumulated numbers of occurrences of black pixel blocks having adjacent sizes, and determining sizes of black pixel blocks corresponding to a highest accumulated number of occurrences, the locating unit 23 may use the following process: sampling the binary image of the partial image according to different reference directions to obtain bar images, identifying lengths of continuous distribution regions in respective statistical histograms of the bar images, counting the number of occurrences of each length as well as adjacent lengths in a length fluctuation range, and selecting lengths corresponding to a highest number of occurrences as the sizes of the black pixel blocks corresponding to the highest number of occurrences.

In an embodiment, when identifying a graphic code image from the partial image based on the size of the symbol, the identification unit 24 may use the following process: scanning a binary image of the partial image by using the size of the symbol as a scanning step length, mapping a set of pixels that are obtained through scanning and meet a scan mode to the binary image of the partial image, and identifying a set of pixels obtained through mapping as the graphic code image.

In an embodiment, when scanning a binary image of the partial image by using the size of the symbol as a scanning step length, the identification unit 24 may use the following process: detecting whether each black pixel in the binary image of the partial image is a black pixel meeting a predetermined scan mode, and detecting whether a white pixel meeting the predetermined scan mode exists at a position having a distance of the scanning step length from the black pixel meeting the predetermined scan mode, so as to obtain a set of the black pixels.

In an embodiment, before the identification unit 24 maps the set of pixels that are obtained through scanning and meet a scan mode to the binary image of the partial image, denoising processing is performed on the set of the pixels based on histograms of the set of the pixels.

An embodiment of the present disclosure further provides a graphic code processing apparatus, including: a processor and a memory that is configured to store a computer program capable of running on the processor. Herein, the processor may be an integrated circuit chip having a signal processing capability. In an implementation process, steps in the foregoing method may be implemented through a hardware integrated logical circuit in the processor, or an instruction in the form of software. The foregoing processor may be a general-purpose processor, a digital signal processor (DSP), another programmable logic device, a discrete gate or a transistor logic device, or a discrete hardware component. The processor can implement or perform the methods, steps and logic block diagrams disclosed in the embodiments of the present disclosure. The general-purpose processor may be a MCU or any regular processor. Steps of the methods disclosed with reference to the embodiments of the present disclosure can be directly performed by a hardware decoding processor or performed by a combination of hardware in a decoding processor and a software module. The software module may be located in a storage medium, and the storage medium is located in the memory. The processor reads information in the memory, and completes the steps in the foregoing methods in combination with hardware thereof.

When running the computer program, the processor is configured to perform the following steps: capturing an environment including a graphic code; determining continuous distribution regions of pixels of a captured image in different reference directions, and identifying an overlapping region of the continuous distribution regions as a potential distribution region of the graphic code; identifying a scanning step length from a partial image corresponding to the potential distribution region, and scanning the partial image based on the scanning step length to obtain a graphic code image; and performing decoding processing based on the graphic code image, until decoding succeeds and information modulated in the graphic code is obtained.

In an embodiment, the processor is further configured to perform the following step: presenting the captured image in a preview interface, the captured image being used for adjusting a capture orientation until the graphic code is completely imaged in the preview interface.

In an embodiment, the processor is further configured to perform the following step: before locating the potential distribution region of the graphic code in the captured image, performing decoding processing based on a partial image that is formed in a scan frame of a preview interface by the captured image, and detecting that decoding fails.

In an embodiment, the processor is further configured to perform the following step: before locating the potential distribution region of the graphic code in the captured image, performing decoding based on a partial image that is formed in a scan frame of a preview interface by the captured image, and when the information modulated in the graphic code is obtained through decoding, stopping capturing the environment comprising the graphic code.

In an embodiment, the performing decoding processing based on the graphic code image includes: performing adjustment until a size of the identified graphic code image is the same as a size of the scan frame, and performing decoding processing based on the adjusted graphic code image.

In an embodiment, the processor is further configured to perform the following step: presenting the information modulated in the graphic code, and/or sending the information modulated in the graphic code to an instance requesting to scan the graphic code.

In an embodiment, the determining continuous distribution regions of pixels of a captured image in different reference directions, and identifying an overlapping region of the continuous distribution regions as a potential distribution region of the graphic code includes: determining continuous distribution regions, which are in different reference directions, of black pixels in a binary image of the captured image, and identifying an overlapping region of the continuous distribution regions as a potential distribution region of the graphic code in the corresponding image.

In an embodiment, the determining continuous distribution regions, which are in different reference directions, of black pixels in a binary image of the captured image includes: determining statistical histograms, which correspond to different reference directions, of the black pixels in the binary image of the captured image, denoising the statistical histograms, and mapping continuous distribution regions in the denoised statistical histograms to regions in the binary image of the corresponding image.

In an embodiment, the denoising the statistical histograms includes: equally dividing the statistical histograms along the corresponding reference directions to obtain equal division blocks, and setting statistical data in an equal division block meeting a predetermined condition to zero.

In an embodiment, the setting statistical data in an equal division block meeting a predetermined condition to zero includes at least one of the following: when a difference degree of the statistical data in the equal division block exceeds a threshold, setting the statistical data in the corresponding equal division block to zero; when statistical data in adjacent equal division blocks of the equal division block is zero, setting the statistical data in the corresponding equal division block to zero; and when a signal-to-noise ratio between the equal division block and an adjacent equal division block is a minimum signal-to-noise ratio between adjacent equal division blocks, setting the statistical data in the corresponding equal division block to zero.

In an embodiment, the identifying a scanning step length from a partial image corresponding to the potential distribution region includes: performing dilation and erosion operations on a binary image of the partial image, identifying black pixel blocks in the binary image of the partial image and accumulated numbers of occurrences of black pixel blocks having adjacent sizes, and identifying a scanning step length based on sizes of black pixel blocks corresponding to a highest accumulated number of occurrences.

In an embodiment, the identifying black pixel blocks in the binary image of the partial image and accumulated numbers of occurrences of black pixel blocks having adjacent sizes, and determining sizes of black pixel blocks corresponding to a highest accumulated number of occurrences includes: sampling the binary image of the partial image according to different reference directions to obtain bar images, identifying lengths of continuous distribution regions in respective statistical histograms of the bar images, counting the number of occurrences of each length as well as adjacent lengths in a length fluctuation range, and selecting lengths corresponding to a highest number of occurrences as the sizes of the black pixel blocks corresponding to the highest number of occurrences.

In an embodiment, the scanning the partial image based on the scanning step length to obtain a graphic code image includes: scanning a binary image of the partial image based on the scanning step length, mapping a set of pixels that are obtained through scanning and meet a scan mode to the binary image of the partial image, and identifying a set of pixels obtained through mapping as the graphic code image.

In an embodiment, the scanning the partial image based on the scanning step length to obtain a graphic code image includes: when black pixels meeting a predetermined scan mode are detected in the binary image of the partial image and it is detected that white pixels meeting the predetermined scan mode exist at positions having a distance of the scanning step length from the black pixels, forming the set based on the detected black pixel.

In an embodiment, the processor is further configured to perform the following step: before the mapping a set of pixels that are obtained through scanning and meet a scan mode to the binary image of the partial image, performing denoising processing on the set of the pixels based on histograms of the set of the pixels.

It should be noted that, the description of the foregoing apparatus embodiment is similar to the description of the foregoing method embodiment. The apparatus embodiment has similar beneficial effects as the method embodiment, and therefore is not described in detail. For technical details not disclosed in the apparatus embodiment of the present disclosure, refer to the description of the method embodiment of the present disclosure. To make the description concise, details are not described herein again.

Accordingly, the embodiments of the present disclosure may have the following beneficial effects.

1) A complete graphic code is identified from images sequentially presented in the preview interface and is decoded. Compared with the method of decoding only based on an image formed in a scan frame, a user only needs to adjust a capture orientation so that the graphic code is completely imaged in the preview interface, and then the graphic code can be decoded. It is unnecessary to continue adjusting the capture orientation such that a complete image of the graphic code is formed in the scan frame. This significantly reduces the operation difficulty of code scanning.

2) When a complete image of the graphic code cannot be formed in the scan frame due to restrictions of an environment, the user only needs to adjust the capture orientation so that a complete image of the graphic code is formed in the preview interface, and then code scanning and decoding can be completed. The present disclosure resolves the problem that in a code scanning manner provided in the related technology, a code cannot be scanned due to restrictions of an environment.

3) For such a situation where code scanning and location fails due to a distance between the QR code and the code scanning device, an adaptive QR code identification method is provided. The locating of the QR code is implemented through data sampling and clustering. Scaling is performed according to a ratio between a data sampling radius and a code scanning frame, so that the size of a QR code image can be adaptively adjusted, achieving an effect of rapid locating and decoding. As such, identification of the QR code will not fail due to an excessively short distance or an excessively long distance to the code scanning device.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. The storage medium includes various media that may store program code, for example, a mobile storage device, a read-only memory (ROM), a random-access memory (RAM), a magnetic disk, or an optical disc.

Alternatively, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the related technology may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: various media that can store program code, such as a removable storage device, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

INDUSTRIAL APPLICABILITY

In the embodiments of the present disclosure, a user can attempt to identify and decode a graphic code in an image presented in a preview interface; compared with the method of decoding only based on an image formed in a scan frame, the user only needs to adjust a capture orientation so that the graphic code is completely imaged in the preview interface, and then the graphic code can be decoded. It is unnecessary to continue adjusting the capture orientation such that a complete image of the graphic code is formed in the scan frame. This significantly reduces the operation difficulty of code scanning. Moreover, when a complete image of the graphic code cannot be formed in the scan frame due to restrictions of an environment, code scanning and decoding can be completed by adjusting the capture orientation so that a complete image of the graphic code is formed in the preview interface. The present disclosure resolves the problem that in a code scanning manner provided in the related technology, identification and decoding fail because a complete image cannot be formed in the scan frame due to restrictions of an environment.

What is claimed is:

1. A graphic code processing method, comprising:
capturing an environment containing a graphic code;
determining continuous distribution regions of pixels of a captured image in different reference directions, and identifying an overlapping region of the continuous distribution regions as a potential distribution region of the graphic code;
identifying a scanning step length from a partial image corresponding to the potential distribution region, and scanning the partial image based on the scanning step length to obtain a graphic code image; and
performing decoding processing based on the graphic code image, until decoding succeeds and information modulated in the graphic code is obtained from the graphic code image.

2. The method according to claim 1, further comprising:
presenting the captured image in a preview interface, the captured image being used for adjusting a capture orientation until the graphic code is completely imaged in the preview interface.

3. The method according to claim 1, further comprising:
before locating the potential distribution region of the graphic code in the captured image, performing decoding processing based on a partial image that is formed in a scan frame of a preview interface by the captured image, and detecting that the decoding processing fails.

4. The method according to claim 1, further comprising:
before locating the potential distribution region of the graphic code in the captured image, performing decoding based on a partial image that is formed in a scan frame of a preview interface by the captured image, and when the information modulated in the graphic code is obtained through decoding, stopping capturing the environment containing the graphic code.

5. The method according to claim 1, wherein the performing decoding processing based on the graphic code image comprises:
adjusting a size of the identified graphic code image to same as a size of the scan frame, and performing decoding processing based on the adjusted graphic code image.

6. The method according to claim 1, further comprising at least one of:
presenting the information modulated in the graphic code, and
sending the information modulated in the graphic code to an instance requesting to scan the graphic code.

7. The method according to claim 1, wherein the determining continuous distribution regions of pixels of a captured image in different reference directions, and identifying an overlapping region of the continuous distribution regions as a potential distribution region of the graphic code comprises:

determining continuous distribution regions, in different reference directions, of black pixels in a binary image of the captured image, and identifying an overlapping region of the continuous distribution regions as the potential distribution region of the graphic code in the corresponding image.

8. The method according to claim 7, wherein the determining continuous distribution regions, in different reference directions, of black pixels in a binary image of the captured image comprises:

determining statistical histograms, corresponding to the different reference directions, of the black pixels in the binary image of the captured image, denoising the statistical histograms, and mapping continuous distribution regions in the denoised statistical histograms to regions in the binary image of the corresponding image.

9. The method according to claim 8, wherein the denoising the statistical histograms comprises:

equally dividing the statistical histograms along the corresponding reference directions to obtain equal division blocks, and setting statistical data in an equal division block meeting a predetermined condition to zero.

10. The method according to claim 9, wherein the setting statistical data in an equal division block meeting a predetermined condition to zero comprises:

when a difference degree of the statistical data in the equal division block exceeds a threshold, setting the statistical data in the corresponding equal division block to zero;

when statistical data in adjacent equal division blocks of the equal division block is zero, setting the statistical data in the corresponding equal division block to zero; and when a signal-to-noise ratio between the equal division block and an adjacent equal division block is a minimum signal-to-noise ratio between adjacent equal division blocks, setting the statistical data in the corresponding equal division block to zero.

11. The method according to claim 1, wherein the identifying a scanning step length from a partial image corresponding to the potential distribution region comprises:

performing dilation and erosion operations on a binary image of the partial image, identifying black pixel blocks in the binary image of the partial image and accumulated numbers of occurrences of black pixel blocks having adjacent sizes, and identifying a scanning step length based on sizes of black pixel blocks corresponding to a highest accumulated number of occurrences.

12. The method according to claim 11, wherein the identifying black pixel blocks in the binary image of the partial image and accumulated numbers of occurrences of black pixel blocks having adjacent sizes, and determining sizes of black pixel blocks corresponding to a highest accumulated number of occurrences comprises:

sampling the binary image of the partial image according to different reference directions to obtain bar images, identifying lengths of continuous distribution regions in respective statistical histograms of the bar images, counting the number of occurrences of each length as well as adjacent lengths in a length fluctuation range, and selecting lengths corresponding to a highest number of occurrences as the sizes of the black pixel blocks corresponding to the highest number of occurrences.

13. The method according to claim 1, wherein the scanning the partial image based on the scanning step length to obtain a graphic code image comprises:

scanning a binary image of the partial image based on the scanning step length, mapping a set of pixels that are obtained through scanning and meet a scan mode to the binary image of the partial image, and identifying a set of pixels obtained through mapping as the graphic code image.

14. The method according to claim 13, wherein the scanning the partial image based on the scanning step length to obtain a graphic code image comprises:

when black pixels meeting a predetermined scan mode are detected in the binary image of the partial image and it is detected that white pixels meeting the predetermined scan mode exist at positions having a distance of the scanning step length from the black pixels, forming the set based on the detected black pixel.

15. The method according to claim 14, further comprising:

before the mapping a set of pixels that are obtained through scanning and meet a scan mode to the binary image of the partial image, performing denoising processing on the set of the pixels based on histograms of the set of the pixels.

16. A graphic code processing apparatus, comprising:

a capture unit configured to capture an environment comprising a graphic code;

a memory storing computer program instructions; and a processor coupled to the memory and, when executing the computer program instructions, configured to perform:

determining continuous distribution regions of pixels of a captured image in different reference directions, and identifying an overlapping region of the continuous distribution regions as a potential distribution region of the graphic code;

identifying a scanning step length from a partial image corresponding to the potential distribution region, and scanning the partial image based on the scanning step length to obtain a graphic code image; and performing decoding processing based on the graphic code image, until decoding succeeds and information modulated in the graphic code is obtained from the graphic code image.

17. The apparatus according to claim 16, wherein the processor is further configured to perform:

presenting the captured image in a preview interface, the captured image being used for adjusting a capture orientation until the graphic code is completely imaged in the preview interface.

18. The apparatus according to claim 16, wherein the processor is further configured to perform:

before locating the potential distribution region of the graphic code in the captured image, performing decoding processing based on a partial image that is formed in a scan frame of a preview interface by the captured image, and detecting that the decoding processing fails.

19. The apparatus according to claim 16, wherein the processor is further configured to perform:

before locating the potential distribution region of the graphic code in the captured image, performing decoding based on a partial image that is formed in a scan frame of a preview interface by the captured image, and when the information modulated in the graphic code is obtained through decoding, stopping capturing the environment containing the graphic code.

20. The apparatus according to claim 16, wherein the performing decoding processing based on the graphic code image comprises:

adjusting a size of the identified graphic code image to same as a size of the scan frame, and performing decoding processing based on the adjusted graphic code image.

* * * * *